(12) United States Patent
Takeda et al.

(10) Patent No.: US 11,490,421 B2
(45) Date of Patent: Nov. 1, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/776,019

(22) Filed: Jan. 29, 2020

(65) Prior Publication Data

US 2020/0170041 A1 May 28, 2020

Related U.S. Application Data

(63) Continuation of application No. 15/500,216, filed as application No. PCT/JP2015/068210 on Jun. 24, 2015, now abandoned.

(30) Foreign Application Priority Data

Jul. 31, 2014 (JP) .............................. JP2014-156210

(51) Int. Cl.
| | | |
|---|---|---|
| *H04W 74/08* | (2009.01) | |
| *H04W 16/32* | (2009.01) | |
| *H04W 72/12* | (2009.01) | |
| *H04W 16/14* | (2009.01) | |

(52) U.S. Cl.
CPC ....... *H04W 74/0816* (2013.01); *H04W 16/32* (2013.01); *H04W 72/1284* (2013.01); *H04W 74/0808* (2013.01); *H04W 16/14* (2013.01)

(58) Field of Classification Search
CPC ......... H04W 74/0816; H04W 74/0808; H04W 16/32; H04W 72/1284; H04W 16/14
See application file for complete search history.

(56) References Cited

U.S. PATENT DOCUMENTS

| | | | |
|---|---|---|---|
| 9,363,829 B2 | 6/2016 | Di Girolamo et al. | |
| 2011/0216722 A1* | 9/2011 | Yang | .................... H04L 1/0073 370/329 |
| 2012/0307919 A1 | 12/2012 | Ranta | |
| 2013/0051383 A1 | 2/2013 | Hakola et al. | |

(Continued)

FOREIGN PATENT DOCUMENTS

| | | |
|---|---|---|
| WO | 2013/006988 A1 | 1/2013 |
| WO | 2013/126858 A1 | 8/2013 |

OTHER PUBLICATIONS

International Search Report issued in PCT/JP2015/068210, dated Sep. 15, 2015 (2 pages).

(Continued)

*Primary Examiner* — Thai Nguyen
(74) *Attorney, Agent, or Firm* — Osha Bergman Watanabe & Burton LLP

(57) ABSTRACT

A user terminal is disclosed that includes a receiver that performs sensing before signal transmission and a transmitter that transmits a Physical Uplink Shared Channel (PUSCH). In addition, the transmitter transmits predetermined information that relates to the transmission of the PUSCH. In other aspects a radio communication method for a user terminal is disclosed.

3 Claims, 23 Drawing Sheets

(56) References Cited

U.S. PATENT DOCUMENTS

| | | | |
|---|---|---|---|
| 2014/0378157 A1 | 12/2014 | Wei et al. | |
| 2015/0208407 A1* | 7/2015 | Yang | H04L 5/1469 |
| | | | 370/280 |
| 2015/0373741 A1* | 12/2015 | Yerramalli | H04W 74/0808 |
| | | | 370/336 |
| 2016/0278088 A1* | 9/2016 | Cheng | H04W 28/18 |
| 2017/0085346 A1 | 3/2017 | Tiirola et al. | |
| 2018/0302868 A1* | 10/2018 | Bhorkar | H04L 1/1887 |

OTHER PUBLICATIONS

Written Opinion of the International Searching Authority issued in PCT/JP2015/068210, dated Sep. 15, 2015 (4 pages).

3GPP TS 36.300 V8.5.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall Description; Stage 2 (Release 8)"; May 2008 (134 pages).

Office Action issued in the counterpart Japanese Patent Application No. 2019-193917, dated Nov. 10, 2020 (6 pages).

\* cited by examiner

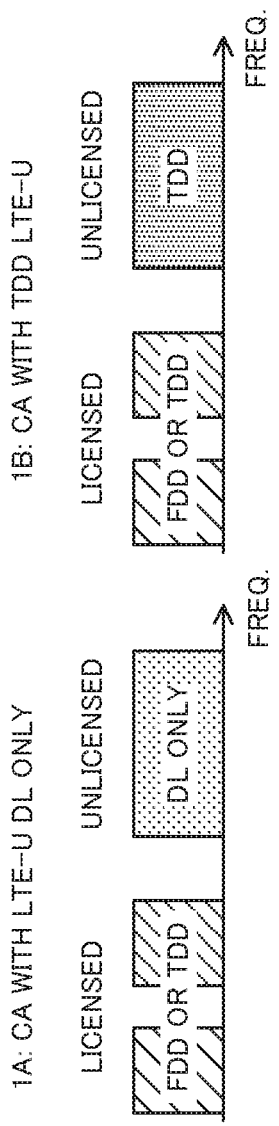
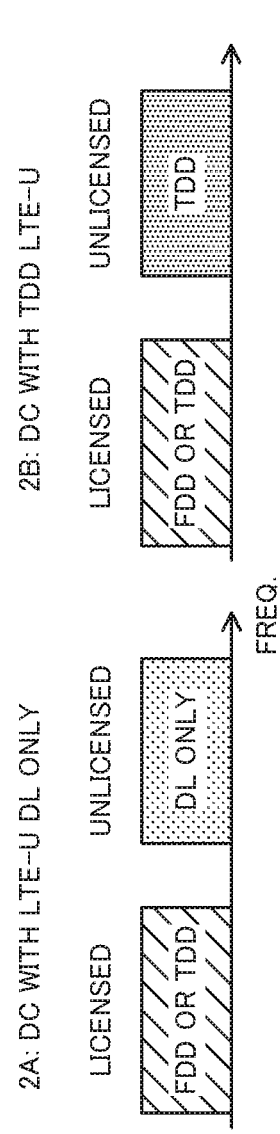
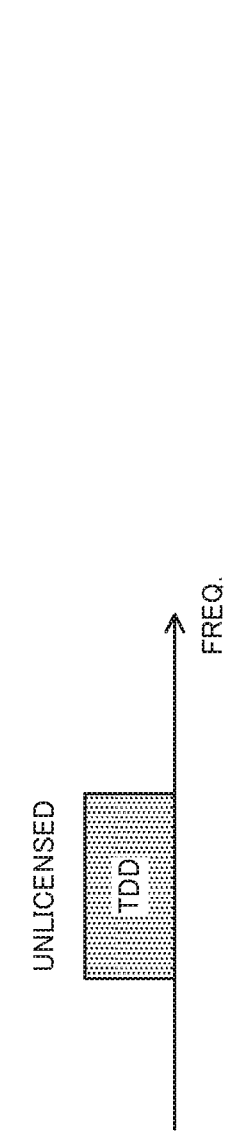

USER TERMINAL AND RADIO COMMUNICATION METHOD

CROSS-REFERENCE TO RELATED APPLICATIONS

This application is a continuation application of U.S. patent application Ser. No. 15/500,216, filed on Jan. 30, 2017, which is a national phase application of PCT/JP2015/068210, filed on Jun. 24, 2015, which claims priority to Japanese Patent Application No. 2014-156210, filed on Jul. 31, 2014. The contents of these applications are hereby incorporated by reference in their entirety.

TECHNICAL FIELD

The present invention relates to a user terminal, a radio base station and a radio communication method that are applicable to next-generation communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (also referred to as, for example, "LTE-advanced" or "LTE enhancement" (hereinafter referred to as "LTE-A")) have been developed for the purpose of achieving further broadbandization and increased speed beyond LTE, and the specifications thereof have been drafted (Rel. 10/11).

In relationship to LTE-A systems, a HetNet (Heterogeneous Network), in which small cells (for example, pico cells, femto cells and so on), each having local a coverage area of a radius of approximately several tens of meters, are formed within a macro cell having a wide coverage area of a radius of approximately several kilometers, is under study. Also, in relationship to HetNets, a study is in progress to use carriers of different frequency bands between macro cells (macro base stations) and small cells (small base stations), in addition to carriers of the same frequency band.

Furthermore, in relationship to future radio communication systems (Rel. 12 and later versions), a system ("LTE-U" (LTE Unlicensed)) to run an LTE system not only in frequency bands that are licensed to communications providers (operators) (licensed bands), but also in frequency bands that do not require license (unlicensed bands), is under study. In LTE-U operations, a mode that is premised upon coordination with licensed band LTE is referred to as "LAA" (Licensed-Assisted Access) or "LAA-LTE. Note that systems that run LTE/LTE-A in unlicensed bands may be collectively referred to as "LAA," "LTE-U," "U-LTE," and so on.

While a licensed band refers to a band in which a specific operator is allowed exclusive use, an unlicensed band (also referred to as a "non-licensed band") refers to a band which is not limited to a specific provider and in which radio stations can be provided. For unlicensed bands, for example, the 2.4 GHz band and the 5 GHz band where Wi-Fi (registered trademark) and Bluetooth (registered trademark) can be used, and the 60 GHz band where millimeter-wave radars can be used are under study for use. Studies are in progress to use such unlicensed bands in small cells.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

The premise of existing LTE is that it is run in licensed bands, and therefore each operator is allocated a different frequency band. However, unlike a licensed band, an unlicensed band is not limited to use by a specific provider. Furthermore, unlike a licensed band, an unlicensed band is not limited to use in a specific radio system (for example, LTE, Wi-Fi, etc.). Consequently, there is a possibility that the frequency band which a given operator uses in LAA overlaps the frequency band which another operator uses in LAA and/or Wi-Fi.

When an LTE/LTE-A system (LTE-U) is run in an unlicensed band, different operators and/or non-operators may set up radio access points (also referred to as "APs," "TPs," etc.) and/or radio base stations (eNBs) without even coordinating and/or cooperating with each other. In this case, detailed cell planning is not possible, and, furthermore, interference control is not possible, and therefore significant cross-interference might be produced in the unlicensed band, unlike a licensed band.

In order to prevent cross-interference in unlicensed bands, a study is in progress to allow an LTE-U base station/user terminal to perform "listening" before transmitting signals and check whether communication is in progress in other base stations/user terminals. This listening operation is also referred to as "LBT" (Listen Before Talk).

There is a demand to introduce LBT functions for UL (UL-LBT) in user terminals in order to prevent interference with UL signals (uplink signals) in LAA systems. However, UL-LBT has never been studied heretofore, and there has been no proposal for transmission control after UL-LBT. In particular, following conventional transmission procedures only after UL transmission is judged to be possible based on UL-LBT raises a problem of requiring a significant delay before the UL transmission is actually carried out. This delay might lower the overall system throughput.

The present invention has been made in view of the above, and it is therefore an object of the present invention to provide a user terminal, a radio base station and a radio communication method which can reduce the decrease of overall system throughput even when user terminals use LBT in systems that run LTE/LTE-A in unlicensed bands.

Solution to Problem

A user terminal according to one aspect of the present invention provides a user terminal that can communicate with a radio base station by using an unlicensed band, and this user terminal has a receiving process section that detects a channel state in the unlicensed band by performing LBT (Listen Before Talk) in a sensing subframe, a control section that controls a predetermined subframe as the sensing subframe, and a transmission section that transmits predetermined information that relates to PUSCH transmission in the sensing subframe based on a result of LBT.

Advantageous Effects of Invention

According to the present invention, it is possible to reduce the decrease of overall system throughput even when user terminals use LBT in systems that run LTE/LTE-A in unlicensed bands.

BRIEF DESCRIPTION OF DRAWINGS

FIGS. 1A, 1B, and 1C provide diagrams to show examples of modes of radio communication systems that use LTE in unlicensed bands;

DESCRIPTION OF EMBODIMENTS

Figure 2:
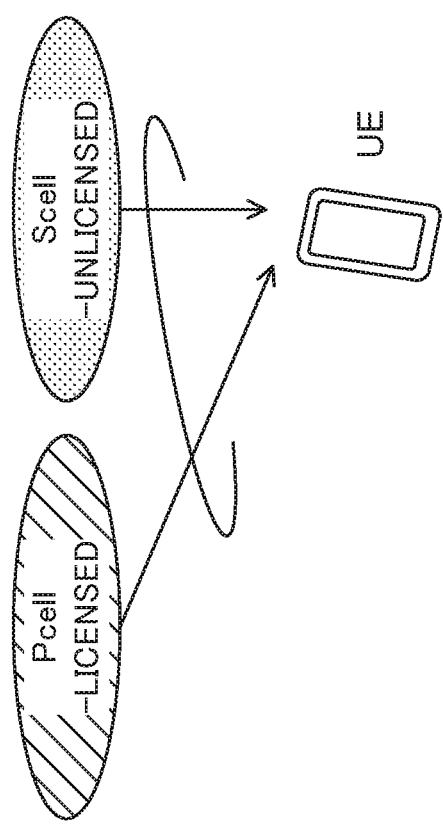
FIG. 2 is a diagram to show an example of a mode of a radio communication system that uses LTE in an unlicensed band.

FIGS. 1A, 1B, and 1C show examples of operation modes in a radio communication system (LTE-U) in which LTE is run in unlicensed bands. As shown in FIG. 1, there may be a plurality of possible scenarios to use LTE in unlicensed bands, such as carrier aggregation (CA), dual connectivity (DC) and stand-alone (SA).

FIG. 1A shows a scenario to employ carrier aggregation (CA) by using licensed bands and unlicensed bands. CA is a technique to bundle a plurality of frequency blocks (also referred to as "component carriers" (CCs), "carriers" "cells," etc.) into a wide band. Each CC has, for example, a maximum 20 MHz bandwidth, so that, when maximum five CCs are bundled, a wide band of maximum 100 MHz is provided.

With the example shown in FIG. 1A, a case is illustrated in which a macro cell and/or a small cell to use licensed bands and small cells to use unlicensed bands employ CA. When CA is employed, one radio base station's scheduler controls the scheduling of a plurality of CCs. Based on this, CA may be referred to as "intra-base station CA" (intra-eNB CA) as well.

In this case, the small cells to use unlicensed bands may use a carrier that is used for DL communication only (scenario 1A) or use a TDD carrier (scenario 1B). The carrier to use for DL communication only is also referred to as a "supplemental downlink" (SDL). Note that FDD and/or TDD can be used in the licensed bands.

Furthermore, a (co-located) structure may be employed here in which a licensed band and an unlicensed band are transmitted and received via one transmitting/receiving point (for example, a radio base station). In this case, the transmitting/receiving point (for example, an LTE/LTE-U base station) can communicate with a user terminal by using both the licensed band and the unlicensed band. Alternatively, it is equally possible to employ a (non-co-located) structure in which a licensed band and an unlicensed band are transmitted and received via different transmitting/receiving points (for example, one via a radio base station and the other one via an RRH (Remote Radio Head) that is connected with the radio base station).

FIG. 1B shows a scenario to employ dual connectivity (DC) by using licensed bands and unlicensed bands. DC is the same as CA in bundling a plurality of CCs (or cells) into a wide band. While CA is based on the premise that CCs (or cells) are connected via ideal backhaul and is capable of coordinated control, which produces very little delay time, DC presumes cases in which cells are connected via non-ideal backhaul, which produces delay time that is more than negligible.

Consequently, in DC, cells are run by separate base stations, and user terminals communicate by connecting with cells (or CCs) that are run by different base stations in different frequencies. So, when DC is employed, a plurality of schedulers are provided individually, and these multiple schedulers each control the scheduling of one or more cells (CCs) managed thereunder. Based on this, DC may be referred to as "inter-base station CA" (inter-eNB CA). Note that, in DC, carrier aggregation (intra-eNB CA) may be employed per individual scheduler (that is, base station) that is provided.

The example shown in FIG. 1B illustrates a case where a macro cell to use a licensed band and small cells to use unlicensed bands employ DC. In this case, the small cells to use unlicensed bands may use a carrier that is used for DL communication only (scenario 2A), or use a TDD carrier (scenario 2B). Note that the macro cell to use a licensed band can use FDD and/or TDD.

In the example shown in FIG. 1C, stand-alone (SA) is employed, in which a cell to run LTE by using an unlicensed band operates alone. Stand-alone here means that communication with terminals is possible without employing CA or DC. In this case, the unlicensed band can be run in a TDD carrier (scenario 3).

FIG. 2 shows an example of an operation mode in a radio communication system (LTE-U) in which LTE is run in an unlicensed band. In the operation modes of CA and DC shown in FIG. 1A and FIG. 1B, for example, as shown in FIG. 2, it is possible to use a licensed band CC (macro cell) as a primary cell (PCell) and use an unlicensed band CC (small cell) as a secondary cell (SCell). Here, the primary cell (PCell) refers to the cell that manages RRC connection, handover and so on when CA/DC is used, and is also a cell that requires UL communication such as data and feedback signals from user terminals. The primary cell is always configured in the uplink and the downlink. A secondary cell (SCell) is another cell that is configured in addition to the primary cell when CA/DC is employed. Secondary cells may be configured in the downlink alone, or may be configured in both the uplink and the downlink at the same time.

Note that, as shown in above FIG. 1A (CA) and FIG. 1B (DC), a mode to presume the presence of licensed-band LTE (licensed LTE) when running LTE-U is referred to as "LAA" (Licensed-Assisted Access) or "LAA-LTE." Note that systems that run LTE/LTE-A in unlicensed bands may be collectively referred to as "LAA," "LTE-U," "U-LTE" and so on.

In LAA, licensed band LTE and unlicensed band LTE are coordinated so as to allow communication with user terminals. LAA may be structured so that a transmission point (for example, a radio base station) to use a licensed band and a transmission point to use an unlicensed band are, when being a distance apart, connected via a backhaul link (for example, optical fiber, the X2 interface and so on).

Now, the premise of existing LTE is that it is run in a licensed band, and therefore each operator is allocated a different frequency band. However, unlike a licensed band, an unlicensed band is not limited to use by a specific provider. Consequently, there is a possibility that the frequency band which a given operator uses in LTE-U overlaps the frequency band which another operator uses in an LAA system, a Wi-Fi system and so on.

When run in an unlicensed band, LTE may be carried out without even synchronization, coordination and/or cooperation between different operators and/or non-operators. In this case, a plurality of operators and/or systems share and use the same frequency in the unlicensed band, and therefore there is a threat of producing cross-interference.

So, in a Wi-Fi system that runs in an unlicensed band, resource allocation is carried out so that, in a given period, all bands are used for a specific user. Consequently, in Wi-Fi, in order to prevent transmitting signals from colliding each other between user terminals, access points and so on, carrier sense multiple access/collision avoidance (CSMA/CA), which is based on the mechanism of LBT (Listen Before Talk), is employed. To be more specific, for example, each transmission point (TP), access point (AP), Wi-Fi terminal (STA: Station) and so on perform "listening" (CCA: Clear Channel Assessment) before carrying out transmission, and carries out transmission only when there is no signal beyond a predetermined level.

In view of the above, LBT is expected to be required even in LTE/LTE-A systems (for example, an LAA system) to be run in unlicensed bands. By introducing LBT in LAA systems, it becomes possible to prevent interference between LAA and Wi-Fi. Also, it is possible to prevent interference between LAA systems. Even when user terminals that can be connected are controlled independently for every operator that runs an LAA system, it is possible to reduce interference without learning the details of the control for each operator, by means of LBT.

In LTE-systems to use LBT, an LTE-U base station and/or a user terminal perform listening (LBT) before transmitting signals in an unlicensed band cell, and, if no signal from other systems (for example, Wi-Fi) and/or other LAA transmission points is detected, the LTE-U base station and/or the user terminal carry out unlicensed band communication. For example, if received power that is equal to or lower than a predetermined threshold is measured in LBT, the LTE-U base station and/or the user terminal judge that the channel is in an idle state (LBT_idle), and carry out transmission. When a "channel is idle," this means that, in other words, the channel is not occupied by a certain system, and it is equally possible to say that the channel is "clear," the channel is "free," and so on.

On the other hand, procedures that are taken when signals from other systems and/or other LAA transmission points are detected as a result of listening include (1) making a transition to another carrier by way of DFS (Dynamic Frequency Selection), (2) applying transmission power control (TPC), (3) holding (stopping) transmission, and so on. For example, when the received power that is measured in LBT exceeds a predetermined threshold, the LTE-U base station and/or the user terminal judge that the channel is in a busy state (LBT_busy), and do not carry out transmission. In the event of LBT_busy, this channel becomes available for use after a predetermined backoff time is over. Note that the method of judging whether a channel is in an idle state/busy state based on LBT is by no means limited to this.

Figure 3B:
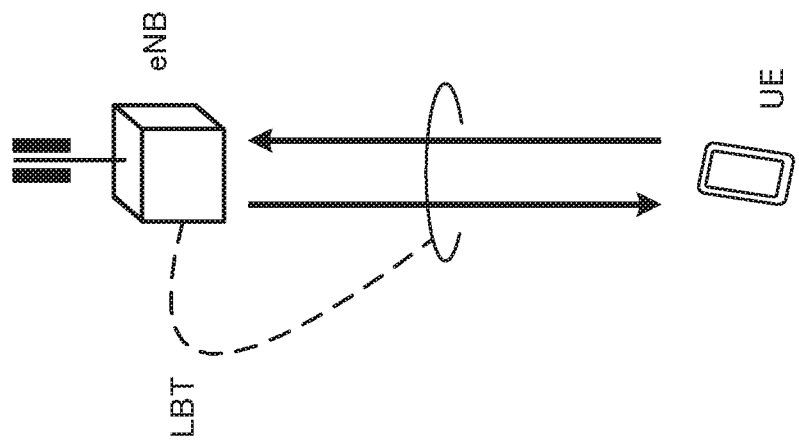
FIGS. 3A and 3B provide diagrams to explain examples of operating agents in LBT in a system that runs LTE/LTE-A in an unlicensed band.
Figure 3A:
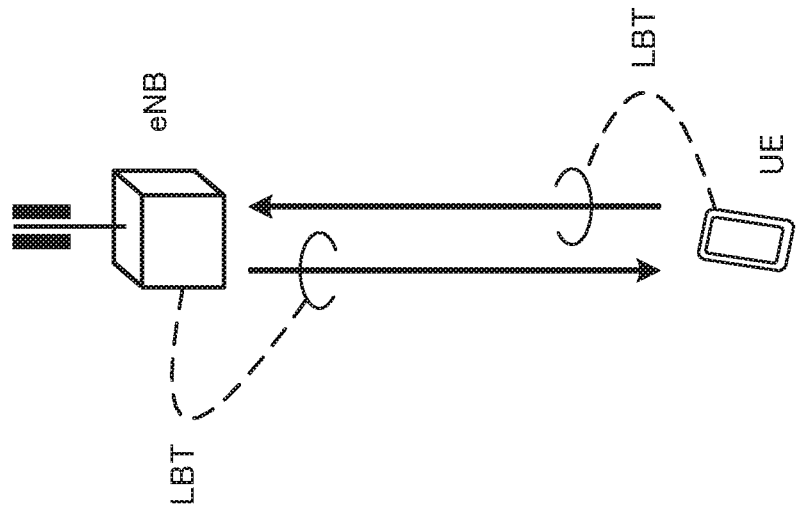

FIGS. 3A and 3B provide diagrams to show operating agents in LBT in a system in which LTE/LTE-A is run in an unlicensed band. In FIGS. 3A and 3B, a radio base station (eNB) to form an unlicensed band cell, a user terminal (UE), and the downlink (DL)/uplink (UL) between these are shown. In the unlicensed band cell, listening (LBT) is carried out before a signal is transmitted, to check whether communication is in progress in other systems (for example, Wi-Fi) or in other LAA (LTE-U) transmission points. FIG. 3A shows an example in which the eNB carries out LBT with respect to both DL and UL. In this case, after the eNB judges that the channel is in the clear state based on LBT, the eNB reports a predetermined signal (for example, a UL grant) to the UE, so that the UE can carry out UL transmission. On the other hand, FIG. 3B shows an example of carrying out LBT on the transmitting side. In this case, LBT is carried out by the eNB in the event of DL transmission and by the UE in the event of UL transmission. Here, the LBT which the user terminal performs with respect to UL may be referred to as "UL-LBT."

When, as shown in FIG. 3B, LBT is executed on the transmitting side, if the result of UL-LBT is LBT_idle, the UE can carry out UL transmission. In conventional LTE systems, uplink transmission is carried out in the following steps. First, the user terminal transmits an uplink scheduling request by transmitting a scheduling request (SR) or a random access preamble (RAP) to use a PRACH, in a UL subframe that is specified in advance. The radio base station, receiving this request, transmits a UL grant to the user terminal, and the user terminal transmits a PUSCH (Physical Uplink Shared CHannel) by using a resource that is based on this grant.

However, if the result of LBT shows LBT_idle, the time this channel can be occupied is limited. For example, in Europe, there is a rule that the maximum time a channel can be occupied is 1 ms to 10 ms. Meanwhile, when, as noted earlier, the result of UL-LBT shows LBT_idle, it takes time before UL data is actually transmitted in the PUSCH. In this way, when time passes after UL-LBT, there is a threat that sufficient UL resources cannot be used due to rules in LBT regarding the time of channel occupancy. Consequently, it is preferable to transmit data as soon as possible after UL-LBT is finished. In particular, following conventional transmission procedures only after UL transmission is judged to be possible based on UL-LBT raises the problem of requiring a significant delay before UL transmission is actually carried out. This delay might lower the overall system throughput.

So, the present inventors have come up with the idea of reducing the delay before UL transmission when a user terminal executes LBT, in a system which runs LTE/LTE-A in an unlicensed band. To be more specific, the present inventors have come up with the idea of allowing a user terminal to transmit predetermined information about PUSCH transmission to the radio base station, based on the result of UL-LBT, in subframes in which UL-LBT has been executed.

According to the present invention, a user terminal can quickly carry out UL transmission after UL-LBT, so that it becomes possible to reduce the increase of delay before UL transmission, and reduce the decrease of overall system throughput in an LTE system in an unlicensed band.

Now, embodiments of the present invention will be described below in detail with reference to the accompanying drawings. Note that, although examples will be illustrated with the following description where LBT is used in an LTE-U operation mode (LAA) that presumes the presence of licensed bands, the embodiments are by no means limited to this. Also, although structures will be presumed below in which user terminals carry out LBT and radio base stations do not carry out LBT, the radio base stations may be capable of carrying out LBT as well.

Figure 4:
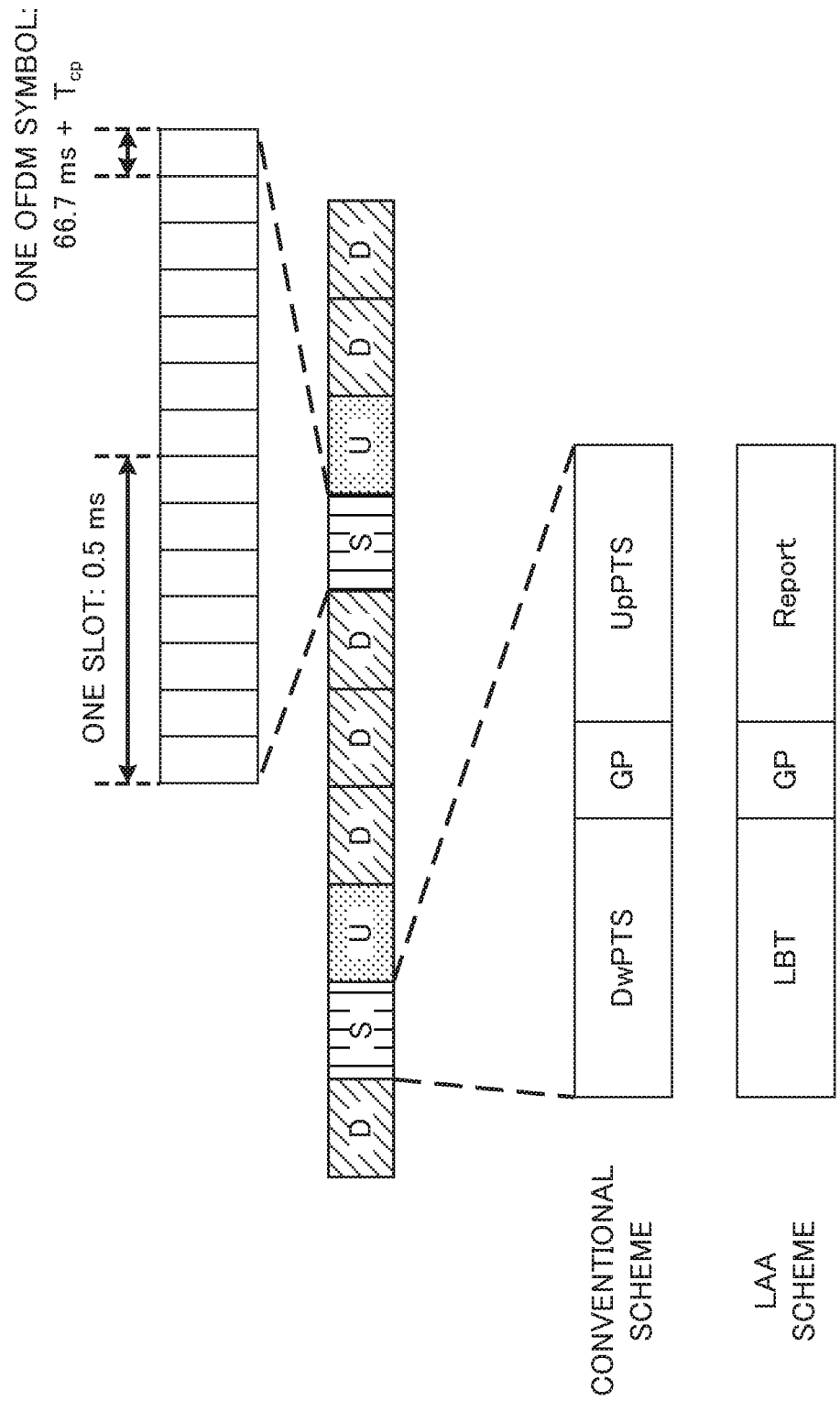
FIG. 4 is a diagram to show examples of frame configurations for LBT in a system that runs LTE/LTE-A in an unlicensed band.

FIG. 4 is a diagram to show examples of frame configurations for LBT in a system in which LTE/LTE-A is run in an unlicensed band. One subframe (1 ms) is comprised of two slots, and one slot is equivalent to 0.5 ms. Also, one slot is comprised of seven OFDM symbols (six symbols when an extended cyclic prefix is used), and one OFDM symbol is equivalent to 66.7 μs+$T_{CP}$ ($T_{CP}$: cyclic prefix length).

Also, the letters assigned to each subframe represents the types of subframes, where "D" stands for downlink (DL) subframes, "U" stands for uplink (UL) subframes, and "S" stands for special subframes or subframes in which LBT-based sensing is carried out (also referred to as "sensing subframes"). Note that the subframe configuration shown in FIG. 4 (the order in which D, U and S are placed) is one example, and this is by no means limiting.

The special subframe according to conventional (Rel. 11) TDD UL/DL configurations is comprised of a DwPTS (Downlink Pilot Time Slot), a GP (Guard Period) and a UpPTS (Uplink Pilot Time Slot). On the other hand, the sensing subframe according to the present invention is comprised of an LBT (LBT period), a GP (Guard Period) and a Report (report period). That is, the sensing subframe configuration according to the present invention is similar to the conventional special subframe configuration, so that it is possible to reduce the cost of implementing user terminals.

The LBT period is used to allow a user terminal to detect channel states. To be more specific, the user terminal carries out listening (LBT) in the LBT period. Here, unlike special subframes, the user terminal does not have to try receiving and demodulating/decoding the PDSCH (Physical Downlink Shared CHannel) in sensing subframes.

The GP is used as a guard period for allowing the user terminal to switch from listening to sending a report. Also, depending on the length of the GP, the serving cell's cell coverage radius is determined. To make the cell radius bigger, a relatively long GP is required. On the other hand, when the cell radius is small, a short GP suffices. That is, the GP is a guard period for switching between transmission and reception.

The report period is a period to transmit feedback information for carrying out transmission in UL subframes following sensing subframes. The feedback information is used to allow the user terminal to transmit the PUSCH and allow the radio base station to receive this PUSCH. That is, this is useful information in PUSCH transmission. Candidates of this useful information include, for example, a scheduling request (SR)/random access preamble (RAP), and so on. With these, it becomes possible to request UL grants and transmit data after sensing. Also, other candidates of useful information include parameters related to the demodulation of the PUSCH, such as resource blocks (RBs), the MCS (Modulation and Coding Scheme) and so on. By using these, it is possible to carry out data transmission after sensing without using UL grants.

Figure 5:
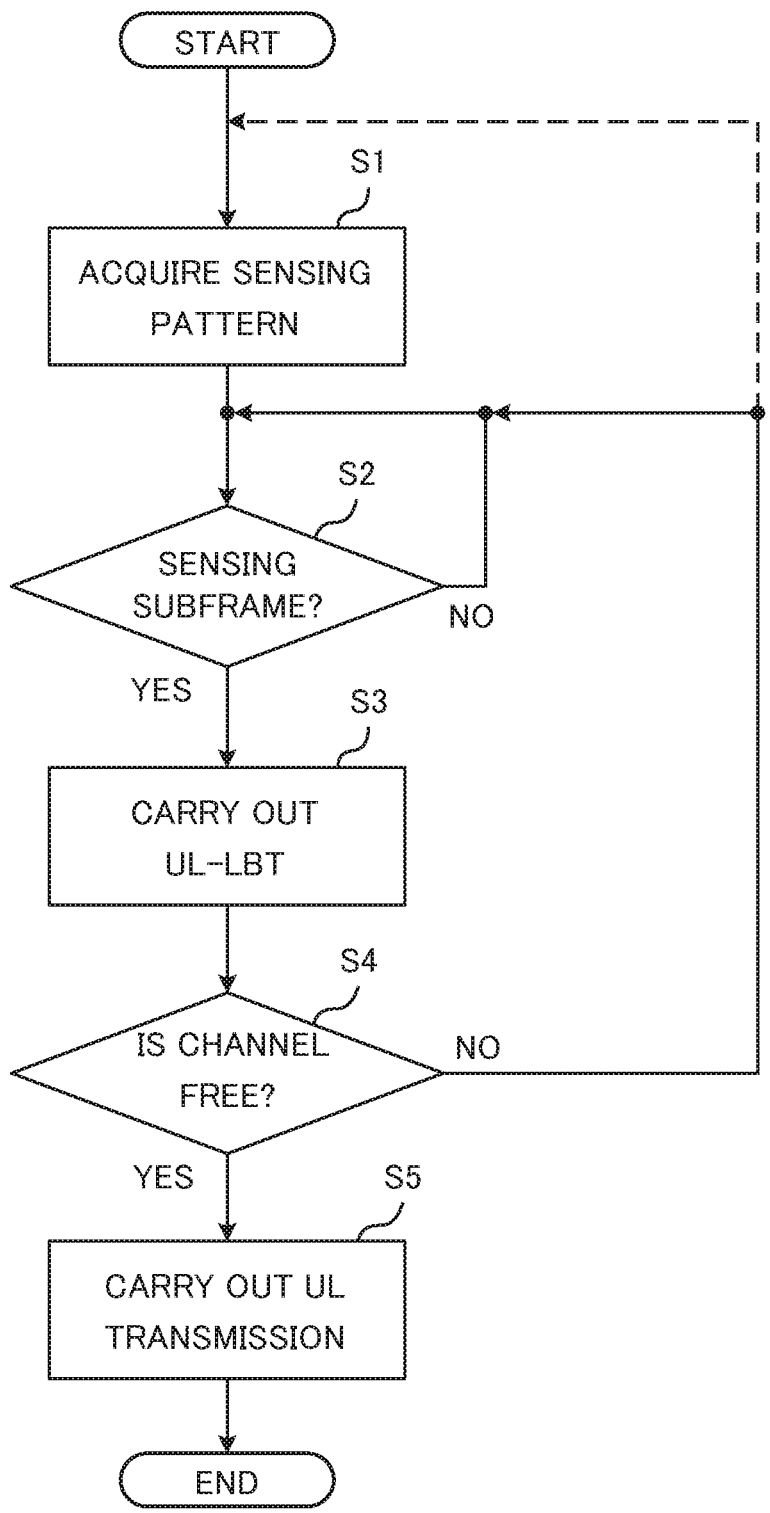
FIG. 5 is a flowchart to show an example of a UL-LBT procedure in a user terminal according to the present invention.

FIG. 5 is a flowchart to show an example of a UL-LBT procedure in a user terminal according to the present invention. First, the user terminal acquires the sensing pattern (step S1). As will be described later, the user terminal acquires the sensing pattern via an implicit or an explicit report, or calculates and acquires the sensing pattern based on predetermined rules.

Here, the sensing pattern refers to information regarding the configuration of LBT-based sensing. In other words, the sensing pattern is information about the timing in which the user terminal performs LBT. The sensing pattern is, for example, formed by combining sensing subframes and the cycle of performing sensing (the cycle of sensing subframes, also referred to as the "sensing period"). The sensing pattern may be expressed as: (the subframes to be sensing subframes, the sensing period). For example, the sensing pattern when sensing is performed in arbitrary subframes, every 1 ms, may be expressed as: (Arbitrary subframes, 1 ms). Note that the sensing pattern is by no means limited to the above format.

The user terminal judges whether or not the current subframe is a sensing subframe based on the sensing pattern (step S2). When the current subframe is not a sensing subframe (step S2: NO), the user terminal carries out step S2 again in the next subframe.

When the current subframe is a sensing subframe (step S2: YES), the user terminal executes UL-LBT (step S3). Then, based on the result of UL-LBT, the user terminal judges whether or not the channel is free (step S4). When judging that the channel not free (step S4: NO), the user terminal carries out step S2 again in the next subframe. Note that, when the sensing pattern is calculated in the user terminal in step S1 and the channel is judged not free, the user terminal may carry out step S1 again (the chained line in FIG. 5).

When judging that the channel is free (step S4: YES), the user terminal carries out UL transmission in the following UL subframe (step S5).

The radio base station may report, to the user terminal, information about the configuration of sensing (for example, information about the subframes to be sensing subframes, the cycle of sensing subframes, etc.) and information about the sensing subframe configuration (for example, the length of each period (LBT, GP, and Report) included in sensing subframes, by using higher layer signaling (for example, RRC signaling) and broadcast information (for example, SIB 1).

Note that, when the same configuration (for example, the configuration of sensing, the sensing subframe configuration, and so on) is applied to user terminals within a cell, this configuration is "cell-specific." Also, when every user terminal employs a different configuration, this configuration is "user-specific."

The present invention primarily relates to step S5 in FIG. 5.

First Embodiment

According to a first embodiment, a user terminal carries out data transmission based on UL grants. In this case, the user terminal transmits information related to UL grants, as predetermined information that relates to PUSCH transmission, in the same subframes as subframes in which UL-LBT is executed.

First, a case will be described below in which the lengths of LBT, GP and Report in sensing subframes are cell-specific (embodiment 1.1). According to embodiment 1.1, when the user terminal judges that a channel is free based on listening in an LBT period, the user terminal transmits an SR/RAP, in the report period of the same sensing subframe, to request a UL grant. Here, the radio resource for mapping the SR/RAP is randomly selected so as to reduce the possibility of contention between user terminals. For example, a radio resource may be selected randomly in the time direction or in the frequency direction within the range of the report period, or a code resource to apply to a radio resource may be selected randomly. The radio base station schedules UL grants with respect to one or a plurality of user terminals from which SRs/RAPs have arrived.

Figure 6:
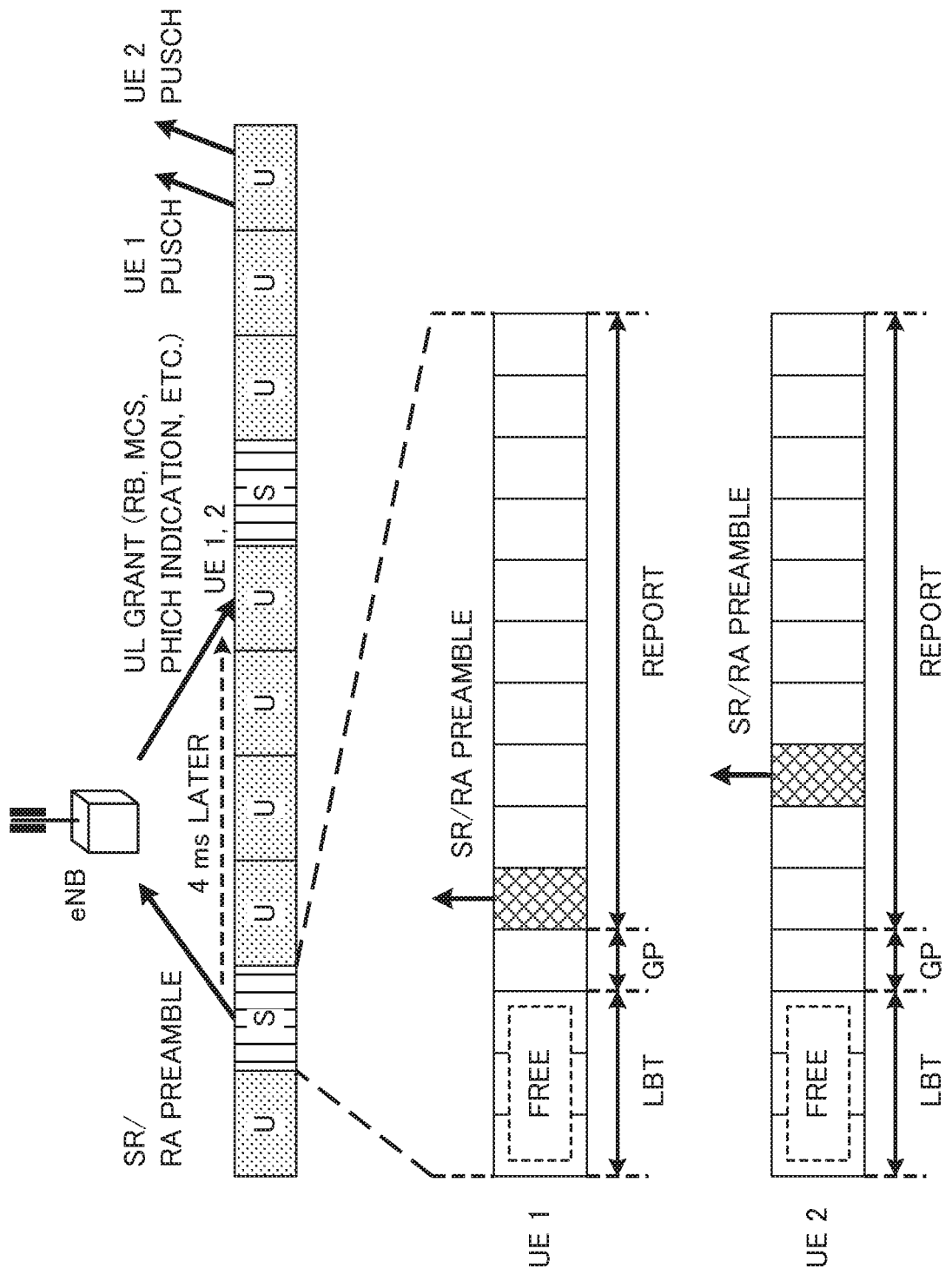
FIG. 6 is a diagram to show an example of a case where the lengths of LBT, GP and Report are cell-specific in a first embodiment.

FIG. 6 is a diagram to show an example of a case where the lengths of LBT, GP and Report are cell-specific according to the first embodiment. The example of FIG. 6 shows a given radio frame and the symbols included in sensing subframes of two user terminals (UEs 1 and 2) in this frame.

UEs 1 and 2 judge that the channel is free in the LBT period, and determine the timing of transmission randomly in the report period. In FIG. 6, UE 1 uses the first OFDM symbol in the report period and UE 2 uses the third OFDM symbol in the report period to transmit an SR/RAP to the radio base station (eNB). As a result of this, a predetermined time (for example, 4 ms) after the sensing subframes, the eNB transmits a UL grant to UEs 1 and 2. The UL grant includes, for example, the resource block (RB) for allocating the PUSCH, the MCS, a PHICH (Physical Hybrid-ARQ Indicator CHannel) resource indication, and so on. When the UL gran is received, UEs 1 and 2 transmit the PUSCH based on this UL grant, and, when a failure of reception of the PUSCH is reported from the eNB a predetermined number of subframes later, UEs 1 and 2 apply retransmission control.

Next, a case will be described below in which the lengths of LBT, GP and Report in sensing subframes are user terminal-specific (embodiment 1.2). According to embodiment 1.2, when a user terminal judges that a channel is free based on listening in an LBT period, the user terminal transmits an SR/RAP by using the first OFDM symbol in the report period of the same sensing subframe, to request a UL grant. Note that the symbol to transmit the SR/RAP is not limited to the first OFDM symbol in the report period, and may be a symbol that overlaps another user terminal's LBT period.

Figure 7:
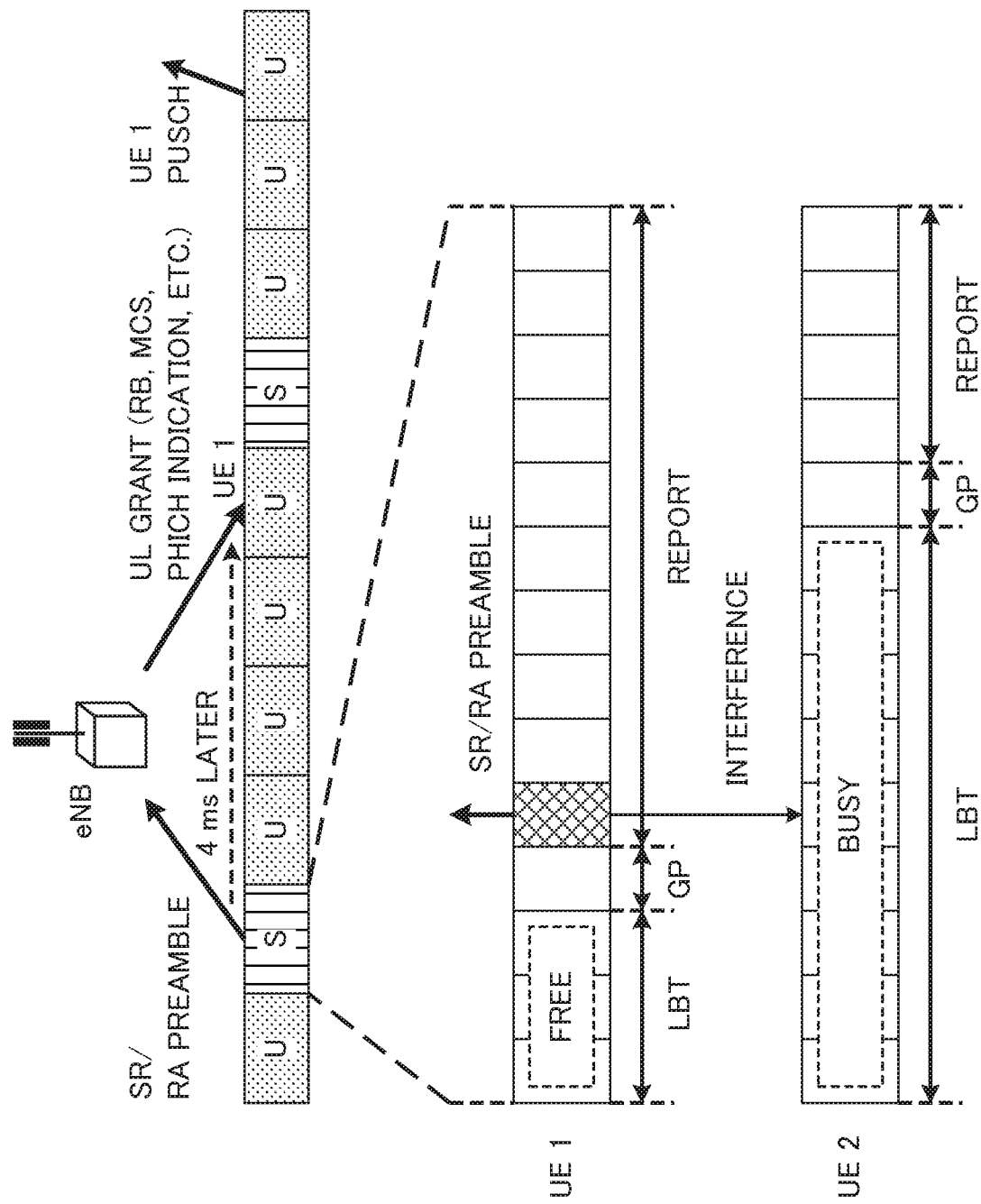
FIG. 7 is a diagram to show an example of a case where the lengths of LBT, GP and Report are user terminal-specific in the first embodiment.

FIG. 7 is a diagram to show an example of a case where the lengths of LBT, GP and Report are user terminal-specific according to the first embodiment. The example of FIG. 7 shows a given radio frame and the symbols included in sensing subframes of two user terminals (UEs 1 and 2) in this frame. Also, the LBT period of UE 1 is configured shorter than the LBT period of UE 2. To be more specific, the sum of the LBT period and the guard period of UE 1 is shorter than the sum of the LBT period and the guard period of UE 2.

When UE 1 judges that the channel is free in the LBT period, UE 1 transmits an SR/RAP by using the first OFDM symbol in the report period. Meanwhile, UE 2 suffers the impact of interference from the SR/RAP transmitted by UE 1, and judges that the channel is busy in the LBT period. As a result of this, the eNB transmits a UL grant to UE 1 a predetermined time (for example, 4 ms) after the sensing subframes. When the UL grant is received, UE 1 transmits the PUSCH based on this UL grant, and, when a failure of reception of the PUSCH is reported from the eNB, UE 1 applies retransmission control a predetermined number of subframes later.

In this way, according to embodiments 1.2, basically the user terminal having the shortest LBT period is given the right to transmit an SR/RAP and transmit the PUSCH. Consequently, it is preferable to change the LBT period semi-statically in order to guarantee the equality transmission opportunities among a plurality of user terminals.

Figure 8:
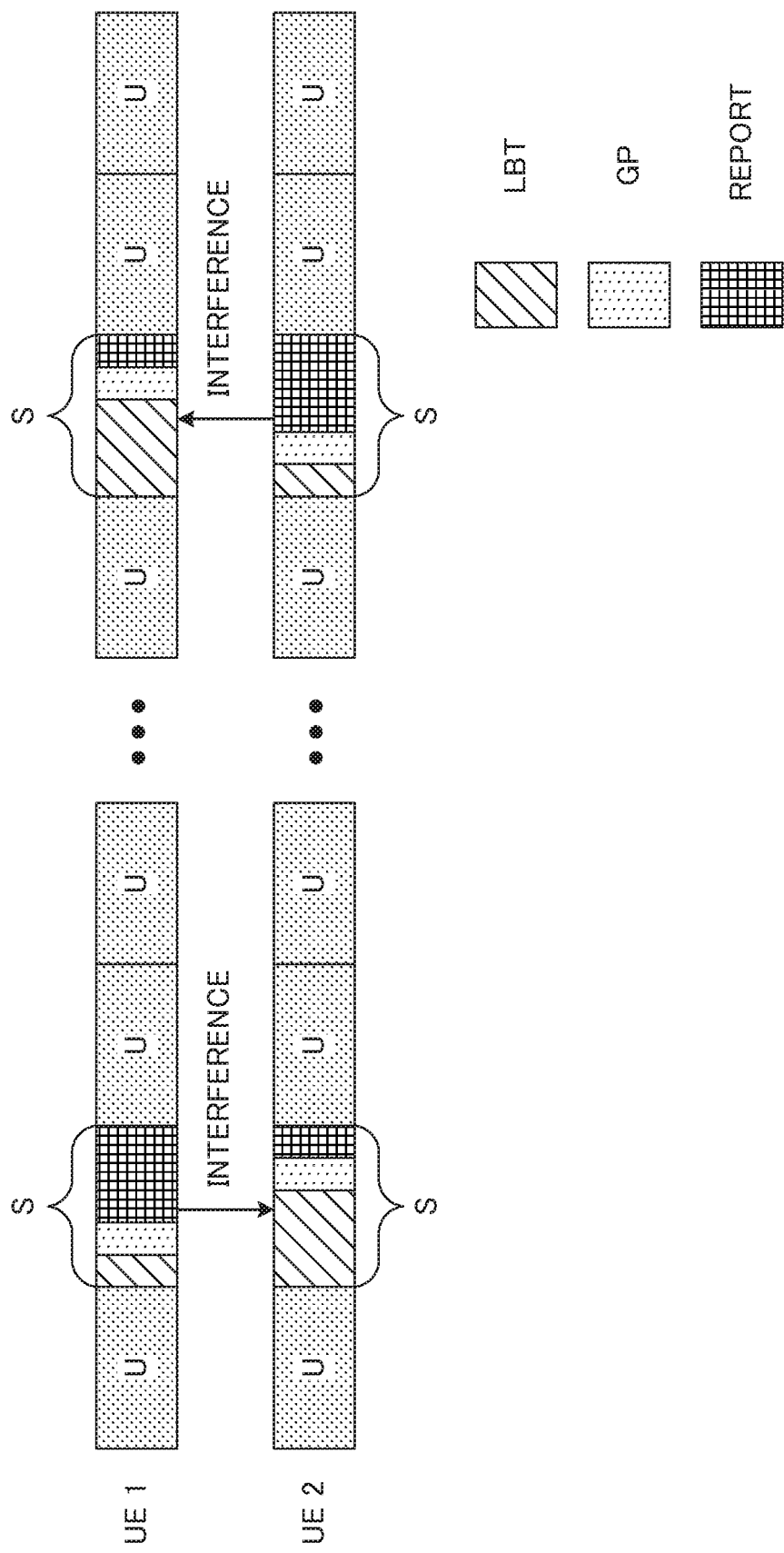
FIG. 8 is a diagram to show an example of a case where the length of the LBT period is changed semi-statically.

FIG. 8 is a diagram to show an example of a case where the length of the LBT period is changed semi-statically. In the example of FIG. 8, the LBT period is shorter in UE 1 than in UE 2 in a given sensing subframe, while, in another sensing subframe, the LBT period is configured longer in UE 1 than in UE 2, so that the equality of transmission opportunities is maintained between the user terminals.

Second Embodiment

A case has been shown above with the first embodiment where a user terminal requests a specific UL grant. A second embodiment, which will be described below, is the same as the first embodiment in that data is transmitted based on UL grants. Now, a case will be described below with the second embodiment where a radio base station reports a plurality of UL grants to a group of user terminals in advance, and each user terminal selects the UL grant that it wants to use. Here, a group of user terminals refers to one or more user terminals to which a plurality of common UL grants are indicated.

Given that the use of the same UL grant between user terminals has a possibility of producing contention, the second embodiment may be referred to as "contention-based PUSCH transmission." Also, a UL grant that is reported to a group of user terminals in common may be referred to as a "contention-based grant (CB grant)," a "common UL grant," and so on. CB grants can be structured to indicate different frequency resources in the same time, so that the second embodiment can improve the efficiency of the use of radio resources even more.

CB grants are detected based on predetermined indicators that correspond to each CB grant. Here, the predetermined indicators may be referred to as, for example, "CB-RNTIs" (Contention-Based Radio Network Temporary Identifiers). The regular PDCCH (Physical Downlink Control CHannel) is transmitted by using C-RNTIs (Cell RNTIs), which are configured on a per user terminal basis, so that it is preferable to configure CB-RNTIs to be different from each user terminal's C-RNTI.

Figure 9:
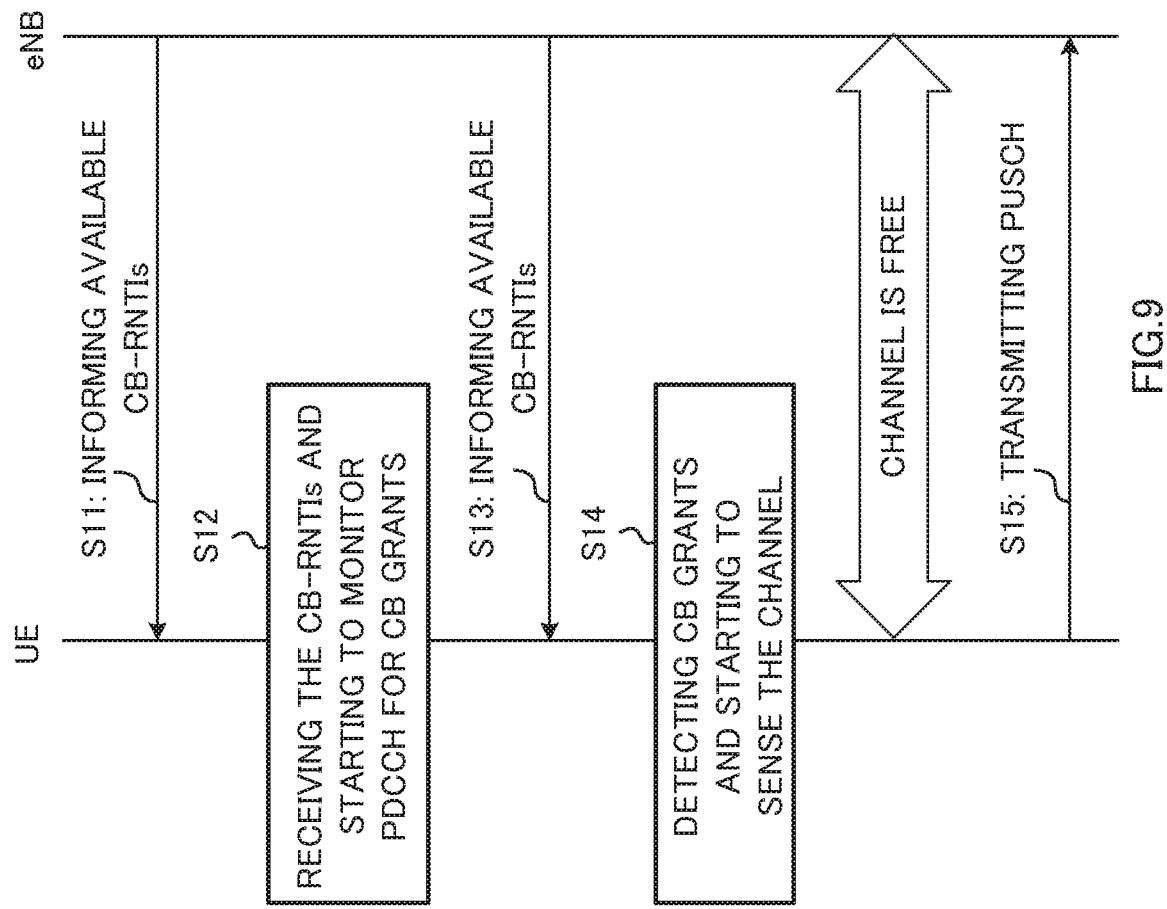
FIG. 9 is a sequence diagram to show an example of a data transmission procedure by a user terminal in a second embodiment.

FIG. 9 is a sequence diagram to show an example of a data transmission procedure in a user terminal according to the second embodiment.

First, the radio base station reports CB-RNTIs that are available for use, to a group of user terminals (step S11). The CB-RNTIs may be reported by using higher layer signaling (for example, RRC signaling), broadcast information (for example, SIB 1) and so on. Also, a plurality of CB-RNTIs may be reported as CB-RNTIs that are available for use.

A user terminal, having received a CB-RNTI, starts monitoring the PDCCH for CB grants based on this CB-RNTI (step S12). When a plurality of CB-RNTIs that are available for use are reported, the user terminal may monitor every PDCCH which these multiple CB-RNTIs indicate, or monitor part of the PDCCHs. Note that EPDCCHs (Enhanced Physical Downlink Control CHannel) may be included among the PDCCHs.

The radio base station transmits CB grants to the user terminal group at predetermined timings (step S13). A user terminal, detecting (receiving) CB grants corresponding to the CB-RNTIs that have been reported as being available for use, starts channel sensing (step S14). To be more specific, the user terminal carries out sensing in the LBT period in a sensing subframe after detecting the CB grants.

When the channel is judged to be free as a result of LBT, one of the CB grants is selected, and information to represent this selected CB grant is reported in the report period. After that, PUSCH transmission is carried out based on the selected CB grant by using a predetermined radio resource (step S15).

Note that steps S14 to S15 of FIG. 9 correspond to steps S2 to S5 of FIG. 5. Also, steps S11 to S13 of FIG. 9 are preferably carried out before step S2 in FIG. 5.

Now, the second embodiment will be described below with reference to specific examples. First, a case will be described below in which the lengths of LBT, GP and Report in sensing subframes are cell-specific (embodiment 2.1). According to embodiment 2.1, a group of predetermined user terminals receive a plurality of common UL grants (CB grants) in advance. A user terminal, when judging that the channel is free based on listening in an LBT period, transmits information to represent a selected CB grant in the report period of the same sensing subframe. Here, the radio resource for mapping the information to represent the selected CB grant is selected randomly in order to reduce the possibility of contention between user terminals. For example, radio resources may be randomly selected in the time direction or in the frequency direction within the range of the report period, or code resources to apply to radio resources may be selected randomly.

Figure 10:
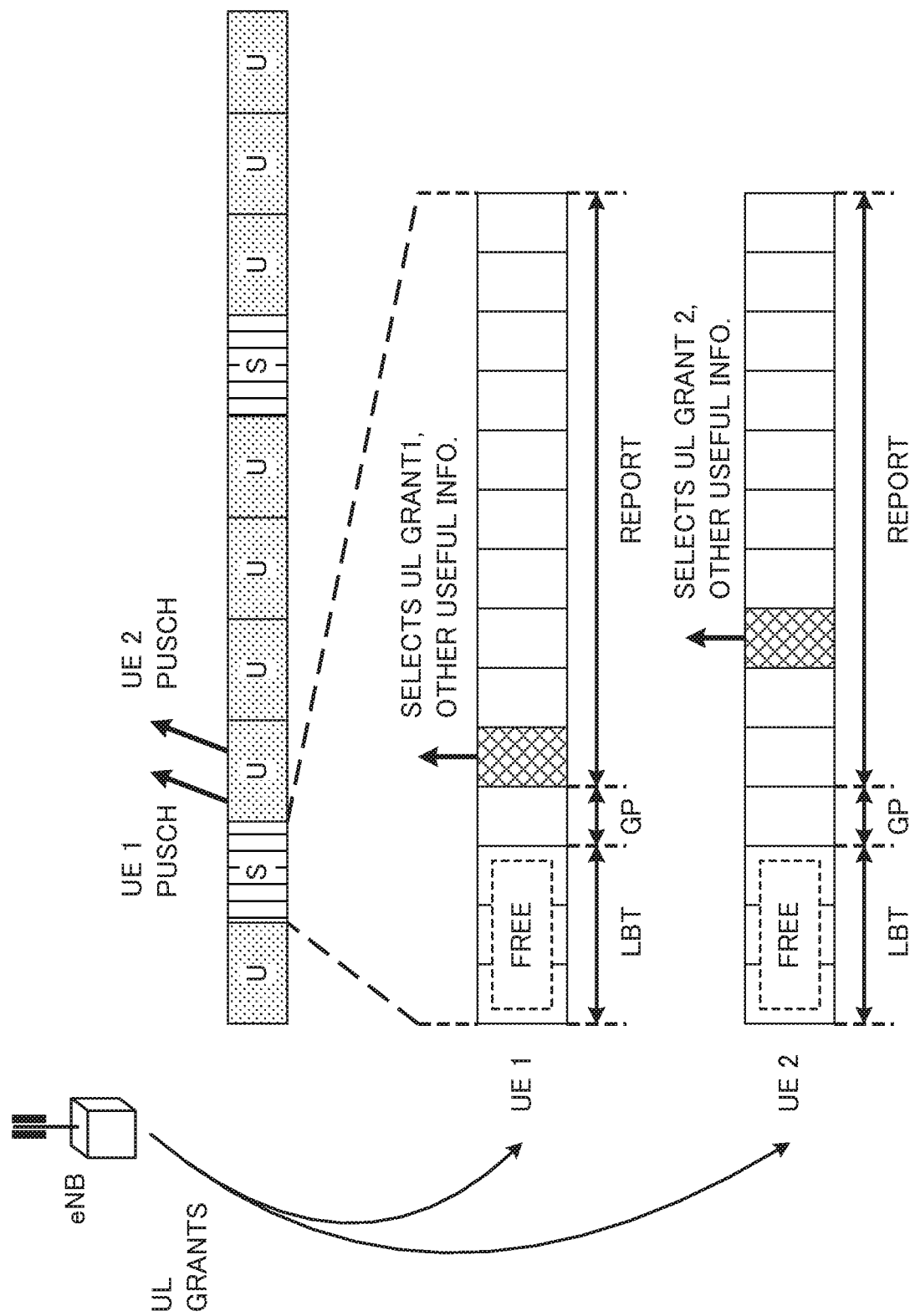
FIG. 10 is a diagram to show an example of a case where the lengths of LBT, GP and Report are cell-specific in the second embodiment.

FIG. 10 is a diagram to explain an example of a case where the lengths of LBT, GP and Report are cell-specific in the second embodiment. UEs 1 and 2 judge that the channel is free in the LBT period, and randomly determine the timing of transmission within the report period. In FIG. 10, by using the first OFDM symbol in the report period and the third OFDM symbol in the report period, respectively, UE 1 and UE 2 transmit information to represent selected CB grants (information to represent a UL grant 1 and a UL grant 2). Then, UEs 1 and 2 transmit PUSCHs based on the selected CB grants, and, when a failure of PUSCH reception is reported from the eNB a predetermined number of subframes later, execute retransmission control.

Here, the information to represent CB grants refers to information which allows the radio base station to know which CB grants the user terminals have selected. For example, indices that are separately linked with a plurality of CB grants may be used, information that relates to the RBs of radio resources which each CB grant indicates (for example, the RB starting location, the number of RBs, the bandwidth of RBs and so on). Note that, with the information to represent CB grants, other pieces of useful information such as, for example, an NAV (Network Allocation Vector), a BSR (Buffer Status Report) and so on may be reported as well.

Next, a case will be described below in which the lengths of LBT, GP and Report in sensing subframes are user terminal-specific (embodiment 2.2). According to embodiment 2.2, a group of predetermined user terminals receive a plurality of common UL grants (CB grants) in advance. A user terminal, when judging that the channel is free based on listening in an LBT period, transmits information that represents a selected CB grant by using the first OFDM symbol in the report period of the same sensing subframe. Note that the symbol to transmit the information to represent the CB grant is not limited to the first OFDM symbol in the report period, and may be a symbol that overlaps another user terminal's LBT period.

Figure 11:
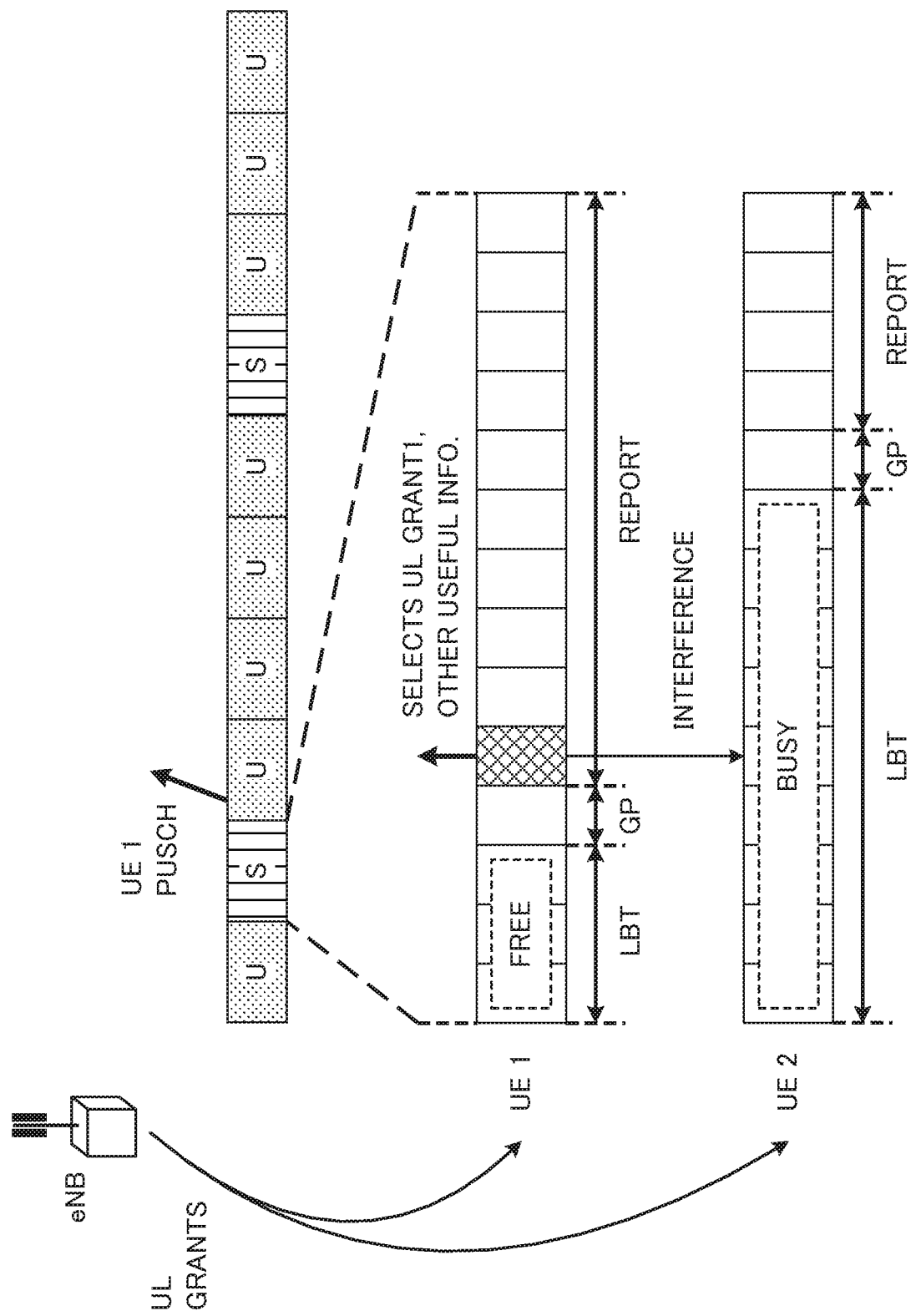
FIG. 11 is a diagram to show an example of a case where the lengths of LBT, GP and Report are user terminal-specific in the second embodiment.

FIG. 11 is a diagram to show an example of a case where the lengths of LBT, GP and Report are user terminal-specific according to the second embodiment. In the example of FIG. 11, the LBT period of UE 1 is configured shorter than the LBT period of UE 2.

UE 1 judges that the channel is free in the LBT period, and transmits information representing a selected CB grant (UL grant 1) by using the first OFDM symbol of the report period. Meanwhile, UE 2 suffers the impact of interference from the signal transmitted from UE 1, and judges that the channel is busy, in the LBT period. UE 1 transmits the PUSCH based on the above CB grant, and, if a failure of reception of the PUSCH is reported from the eNB a predetermined number of subframes later, executes retransmission control.

In this way, according to embodiments 2.2, basically the user terminal having the shortest LBT period is given the right to transmit the PUSCH. Consequently, as shown in FIG. 8, it is preferable to change the LBT period semi-statically in order to guarantee the equality transmission opportunities among a plurality of user terminals.

As described above, according to the second embodiment, it is possible to save the time after an SR/RAP is transmitted, until a UL grant is received, unlike the first embodiment. Consequently, user terminals can transmit the PUSCH with low delays, and it becomes possible to reduce the decrease of overall system throughput.

Note that, with the second embodiment, each user terminal may select and use a plurality of CB grants. This may increase the possibility of contention of UL grants in the event of embodiment 2.1, but it still becomes possible to transmit data in a short time by using a plurality of UL grants. Also, in the event of embodiment 2.2, a specific user terminal that judges that the channel is free based on LBT can transmit large data in a short time by using all of a plurality of UL grants allocated, so that it becomes possible to improve this terminal's uplink throughput and efficiency of the use of radio resources.

Third Embodiment

Cases have been shown above with the first and second embodiments where a user terminal request a specific or a common UL grant. According to a third embodiment, which will be described below, unlike the first and second embodiments, user terminals transmit data without using UL grants. In this case, the user terminals determine, as predetermined information that relates to PUSCH transmission, information that is necessary for PUSCH demodulation (for example, the resource block (RB) to allocate the PUSCH, the MCS, the PHICH resource indication and so on), and transmit these pieces of information to the radio base station in the same subframe as a subframe in which UL-LBT is executed. The information that is necessary for PUSCH demodulation is, in other words, information that is required to transmit the PUSCH.

Figure 12:
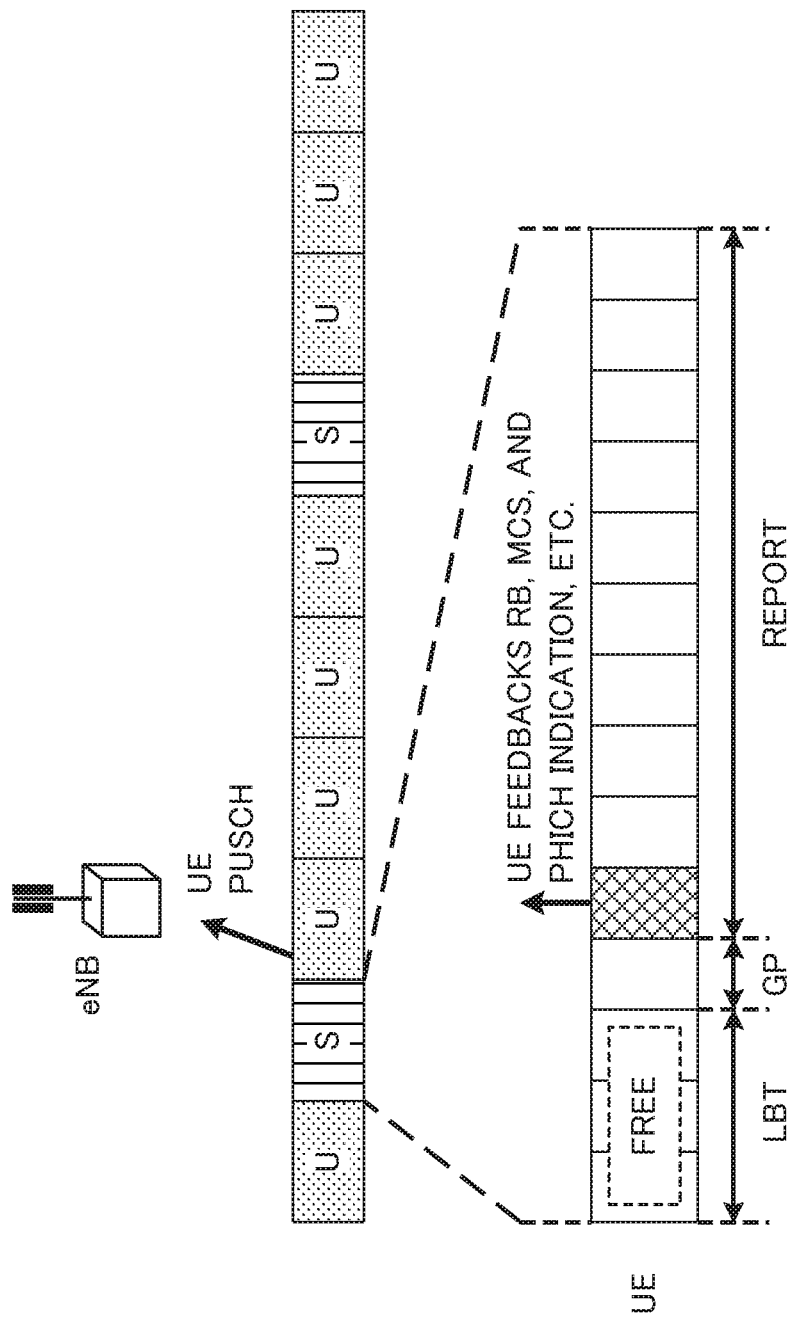
FIG. 12 is a diagram to show an example of a third embodiment.

FIG. 12 is a diagram to show an example of the third embodiment. The UE judges that the channel is free in the LBT period, transmits information that is necessary for PUSCH demodulation and so on in the report period, and transmits the PUSCH in the following UL subframe based on these pieces of information.

Now, the information that is necessary for PUSCH demodulation reported in the third embodiment will be described below. The RB, the MCS and the PHICH resource indication which will be described below are by no means limiting, and other pieces of information may be included as well.

The RB can be determined based on the uplink bandwidth in which the user terminal performs sensing upon LBT. Consequently, the RBs may use the whole bandwidth of an unlicensed band, or use the bandwidth of a predetermined subband.

Figure 13:
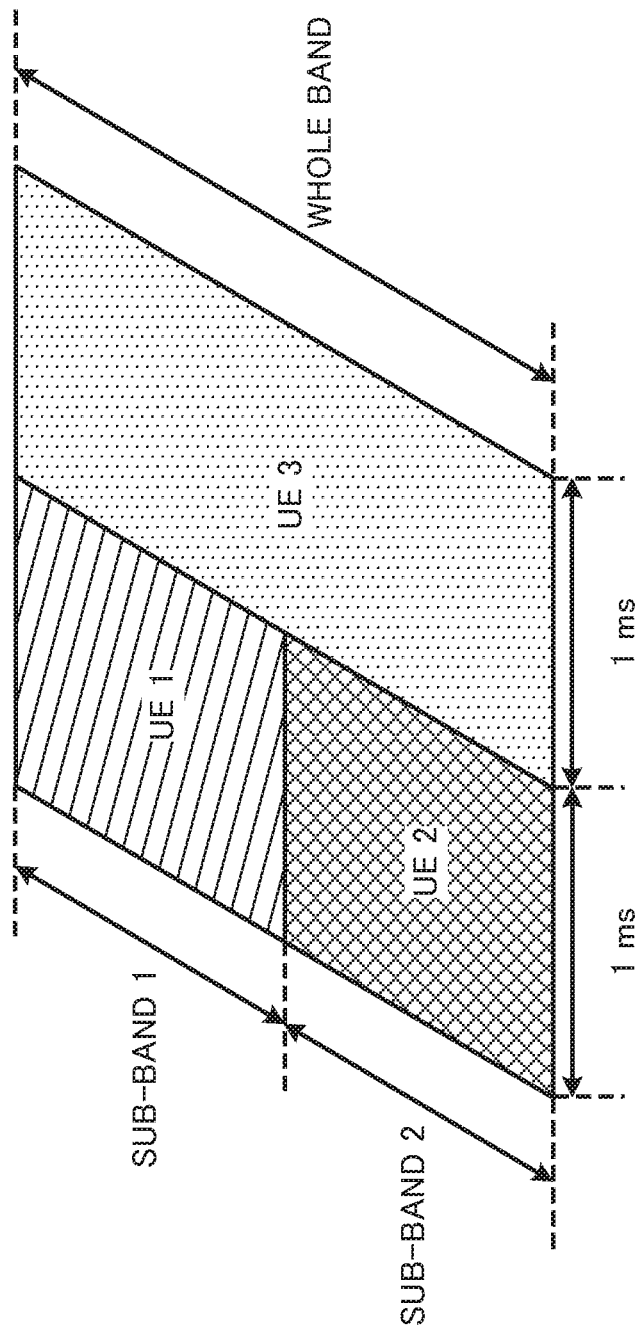
FIG. 13 is a diagram to show an example of allocation of UL signals in an unlicensed band.

FIG. 13 is a diagram to show an example of allocation of UL signals in an unlicensed band. In this example, in a given subframe, UE 1 and UE 2 carry out transmission by using the RB of subband 1 and the RB of subband 2, respectively. Also, in a different subframe, UE 3 carries out transmission using the RB of the whole bandwidth. Note that the allocation of UL signals is by no means limited to the example of FIG. 13, and a structure may be employed in which the number of user terminals and the bandwidth are different, each RB is allocated differently, and so on. The MCS is determined by, for example, following equation 1.

$$MCS=f(\text{desired } BLER, SINR) \quad \text{(Equation 1)}$$

Here, f represents a predetermined function. The BLER represents the block error rate, and can be determined from, for example, the total number of blocks received, and the number of blocks including errors. Where $SINR=P_T/P_I$ holds, $P_T$ is the user terminal's transmission power, and $P_I$ is the interference power estimated by the user terminal. The interference power can be estimated from, for example, the unlicensed band measurement results in a predetermined period.

The user terminal calculates these values and feeds back a specific MCS to the radio base station. The MCS is, for example, an MCS index that represents a combination of a predetermined modulation scheme and coding rate.

Also, the MCS may be determined from following equation 2.

$$MCS=\text{the latest } DCI_{MCS}-Delta_{offset} \quad \text{(Equation 2)}$$

Here, the latest DCImcs refers to the MCS that is included in the latest DCI that has been received using the PDCCH. Also, the $Delta_{offset}$ is a value to represent the difference between the latest $DCI_{MCS}$ and the MCS the user terminal employs to transmit the PUSCH.

Figure 14:
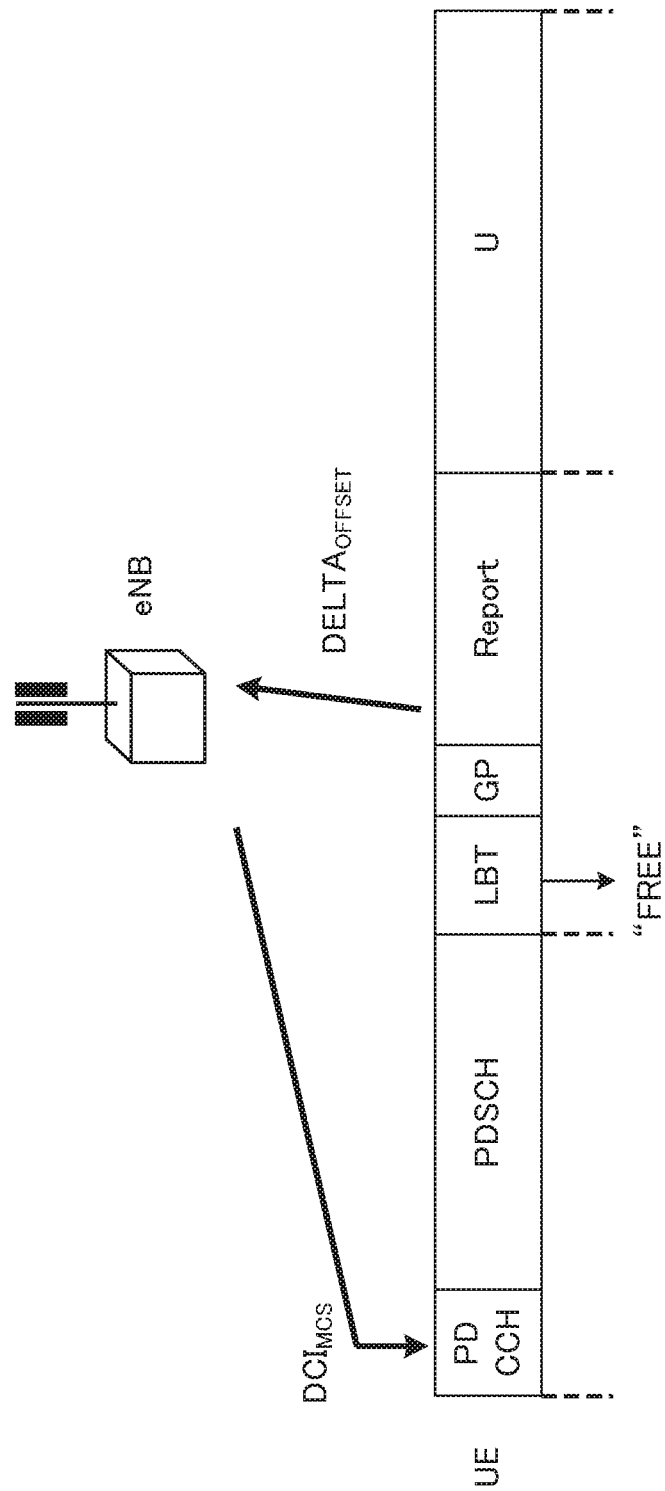
FIG. 14 is a diagram to show an example of a report of MCS according to the third embodiment.

FIG. 14 is a diagram to show an example of a report of an MCS according to the third embodiment. When a result of LBT yields "free," the user terminal calculates a $Delta_{offset}$ by using the latest $DCI_{MCS}$ included in the PDCCH in one subframe before, based on, for example, equation 2, and transmits the $Delta_{offset}$ in the report period.

Figure 15:
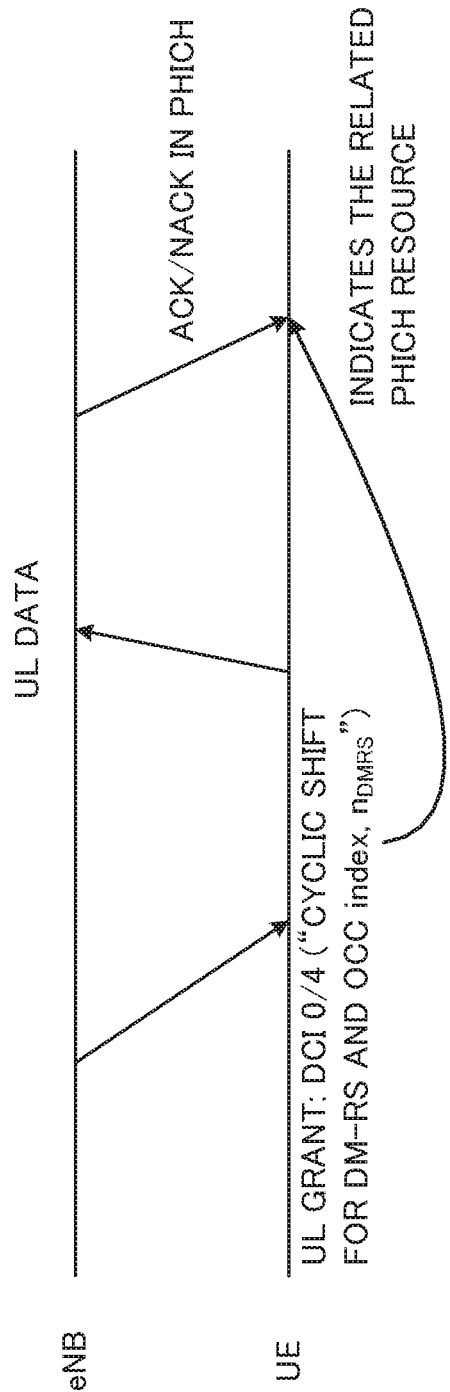
FIG. 15 is a diagram to show an example of a conventional PHICH resource indication.

Next, before describing the PHICH resource indication according to the third embodiment, the conventional method of indicating PHICH resources will be described first. FIG. 15 is a diagram to show an example of a conventional PHICH resource indication.

First, the radio base station (eNB) transmits a UL grant (for example, DCI 0/4) to the user terminal. This UL grant includes nDMRs, which is a value that relates to the cyclic shift of the DM-RS (Demodulation Reference Signal) used in UL transmission.

Next, the user terminal (UE) transmits UL data in the PUSCH based on the UL grant. Based on whether or not this UL data is received properly, the radio base station transmits an HARQ delivery acknowledgement signal (ACK/NACK) in the PHICH. Here, the radio resource where the ACK/NACK is allocated is linked with nDMRs, so that the user terminal can monitor the adequate PHICH based on nDMRS.

Meanwhile, the third embodiment does not use UL grants, and therefore $n_{DMRS}$ is determined as follows. According to the third embodiment, nDMRS may be defined with a fixed value (for example, $n_{DMRS}=0$). By this means, it is possible to reduce the volume of signaling pertaining to $n_{DMRS}$. This structure is suitable when only one user terminal transmits the PUSCH.

Also, with the third embodiment, $n_{DMRS}$ may be linked with a predetermined parameter. For example, $n_{DMRS}$ may be mapped to a C-RNTI (Cell RNTI), which is configured on a per user terminal basis, or may be mapped to a subband index, which indicates the subband. By this means, it is possible to reduce the volume of signaling pertaining to $n_{DMRS}$. This structure is suitable when a plurality of user terminals transmit the PUSCH.

Figure 16:
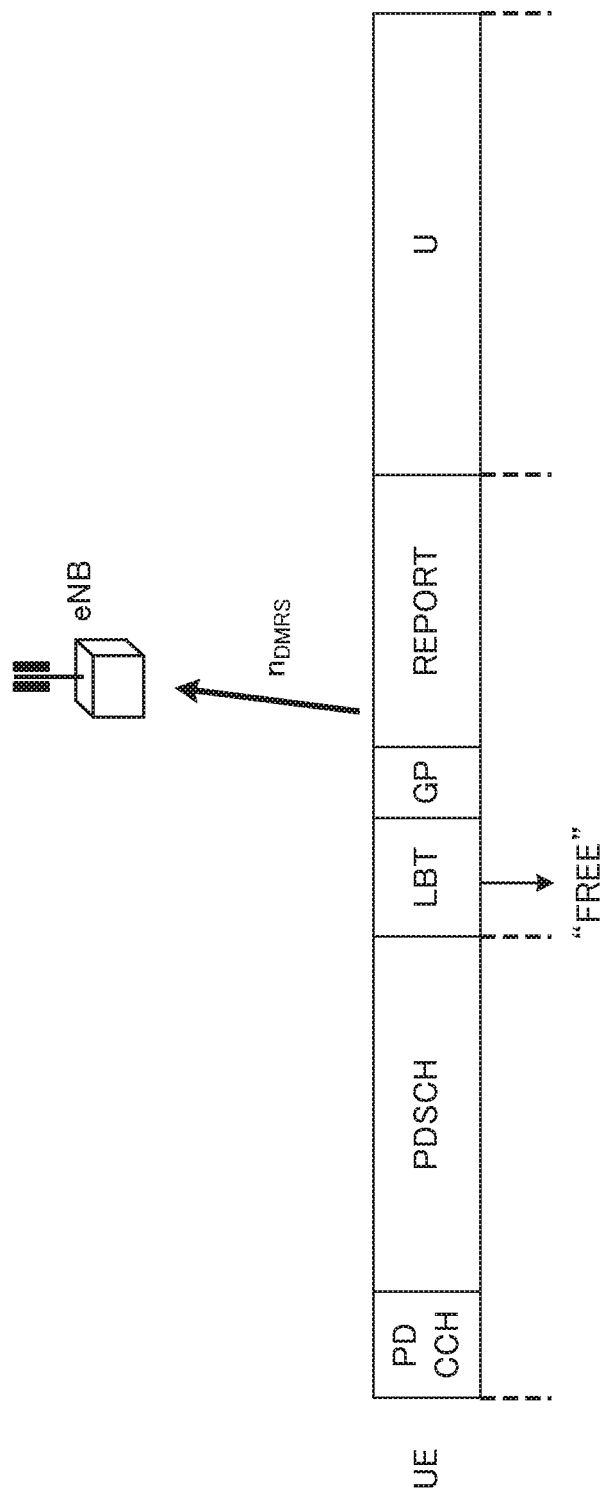
FIG. 16 is a diagram to show an example of a report of nDMRs according to the third embodiment.

Also, according to the third embodiment, $n_{DMRS}$ may be selected by the user terminal. This selection may be random, or may be based on a predetermined parameter (for example, a C-RNTI). FIG. 16 is a diagram to show an example of a report of $n_{DMRS}$ according to the third embodiment. As shown in FIG. 16, a user terminal feeds back a selected $n_{DMRS}$ to the radio base station.

Now, the third embodiment will be described below with specific examples. First, a case will be described below in which the lengths of LBT, GP and Report in sensing subframes are cell-specific (embodiment 3.1). According to embodiment 3.1, when a user terminal judges that the channel is free based on listening in an LBT period, the user terminal transmits information that is used to demodulate the PUSCH (for example, the RB, the MCS, the PHICH resource indication, the C-RNTI and so on) in the report period of the same sensing subframe. Note that other pieces of useful information may be transmitted with the information that is used to demodulate the PUSCH. Here, the radio resources for mapping various kinds of information in the report period are selected randomly in order to reduce the possibility of contention between user terminals. For example, radio resources may be randomly selected in the time direction or in the frequency direction within the range of the report period, or code resources to apply to radio resources may be selected randomly.

Figure 17:
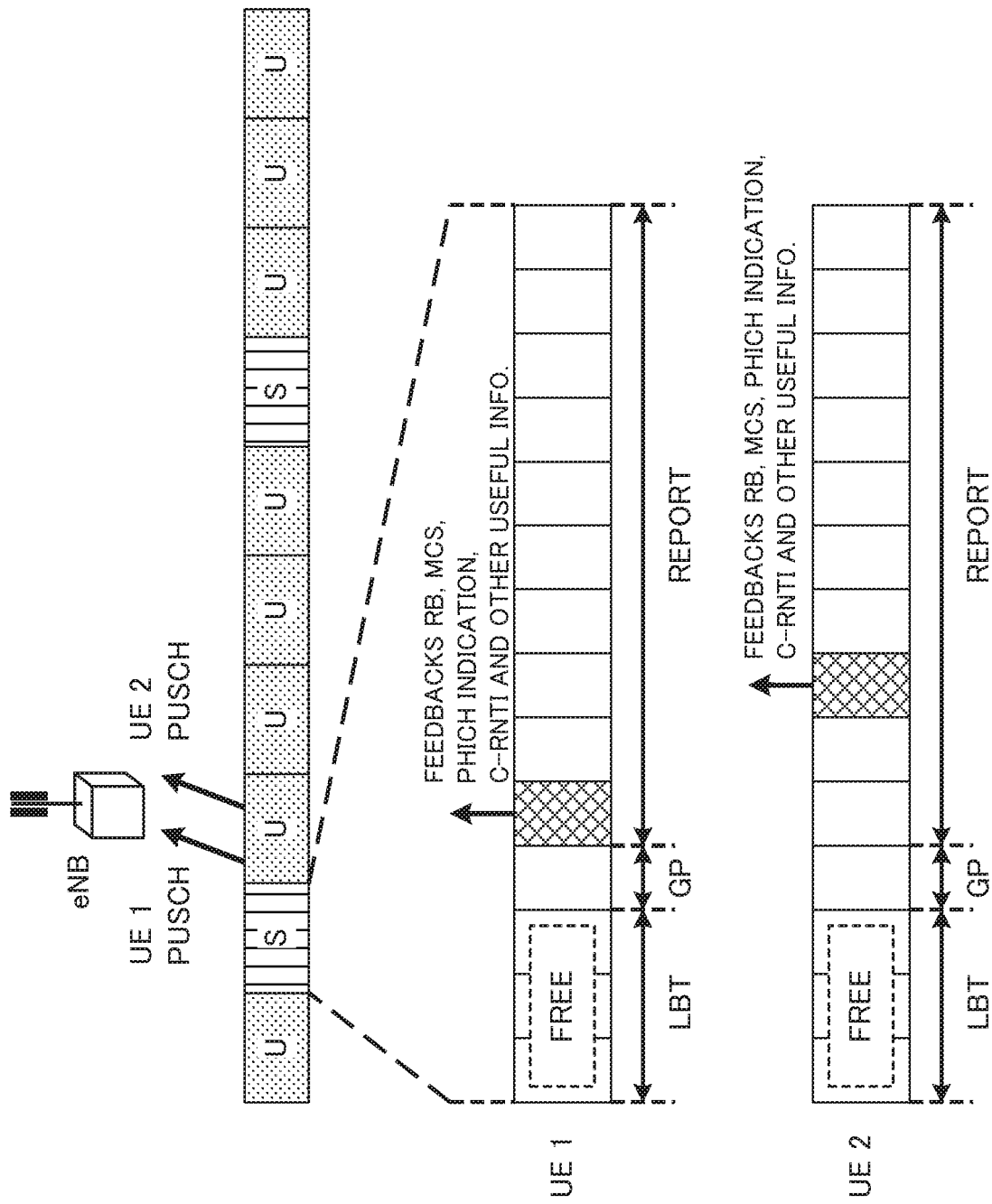
FIG. 17 is a diagram to show an example of a case where the lengths of LBT, GP and Report are cell-specific in the third embodiment.

FIG. 17 is a diagram to show an example of a case where the lengths of LBT, GP and Report are cell-specific according to the third embodiment. UEs 1 and 2 judge that the channel is free in the LBT period, and determine the timing of transmission randomly in the report period. In FIG. 17, UE 1 uses the first OFDM symbol in the report period and UE 2 uses the third OFDM symbol in the report period to transmit the information that is used to demodulate the PUSCH (for example, the RB, the MCS, the PHICH resource indication, the C-RNTI and so on). UEs 1 and 2 transmit the PUSCH based on the above pieces of information, and, when a failure of reception of the PUSCH is reported from the eNB a predetermined number of subframes later, UEs 1 and 2 apply retransmission control.

Next, a case will be described below in which the lengths of LBT, GP and Report in sensing subframes are user terminal-specific (embodiment 3.2). According to embodiment 3.2, when a user terminal judges that the channel is free based on listening in an LBT period, the user terminal transmits the information to be used to demodulate the PUSCH by using the first OFDM symbol in the report period of the same sensing subframe. Note that the symbol to transmit the information to use to demodulate the PUSCH is not limited to the first OFDM symbol in the report period, and may be another symbol that overlaps another user terminals' LBT period.

Figure 18:
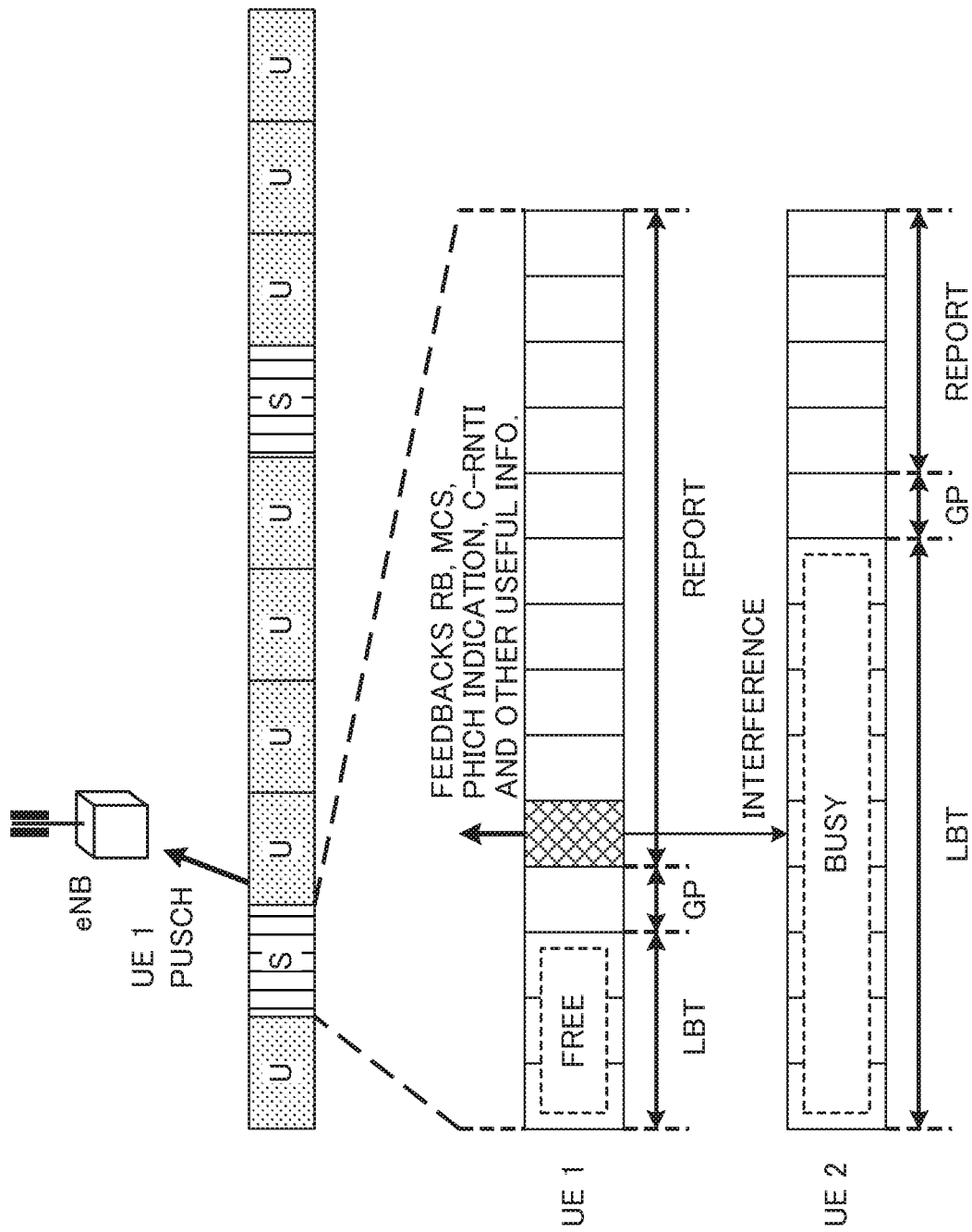
FIG. 18 is a diagram to show an example of a case where the lengths of LBT, GP and Report are user terminal-specific in the third embodiment.

FIG. 18 is a diagram to show an example of a case where the lengths of LBT, GP and Report are user terminal-specific. In the example of FIG. 18, the LBT of UE 1 is configured shorter than the LBT period of UE 2.

UE 1 judges that the channel is free in the LBT period, and transmits information that is necessary for PUSCH demodulation (the RB, the MCS, the PHICH resource indication, the C-RNTI and so on) by using the first OFDM symbol in the report period. Meanwhile, UE 2 suffers the impact of interference from the signal transmitted from UE 1, and judges that the channel is busy, in the LBT period. UE 1 transmits the PUSCH based on the above pieces of information, and, if a failure of reception of the PUSCH is reported from the eNB a predetermined number of subframes later, executes retransmission control.

In this way, according to embodiments 3.2, basically the user terminal having the shortest LBT period is given the right to transmit the PUSCH. Consequently, as shown in FIG. 8, it is preferable to change the LBT period semi-statically in order to guarantee the equality transmission opportunities among a plurality of user terminals.

(Structure of Radio Communication System)

Now, the structure of a radio communication system according to one embodiment of the present invention will be described below. In this radio communication system, the above-described radio communication methods according to the first to third examples are employed. Note that the above-described radio communication methods of the first to third examples may be applied individually or may be applied in combination.

Figure 19:
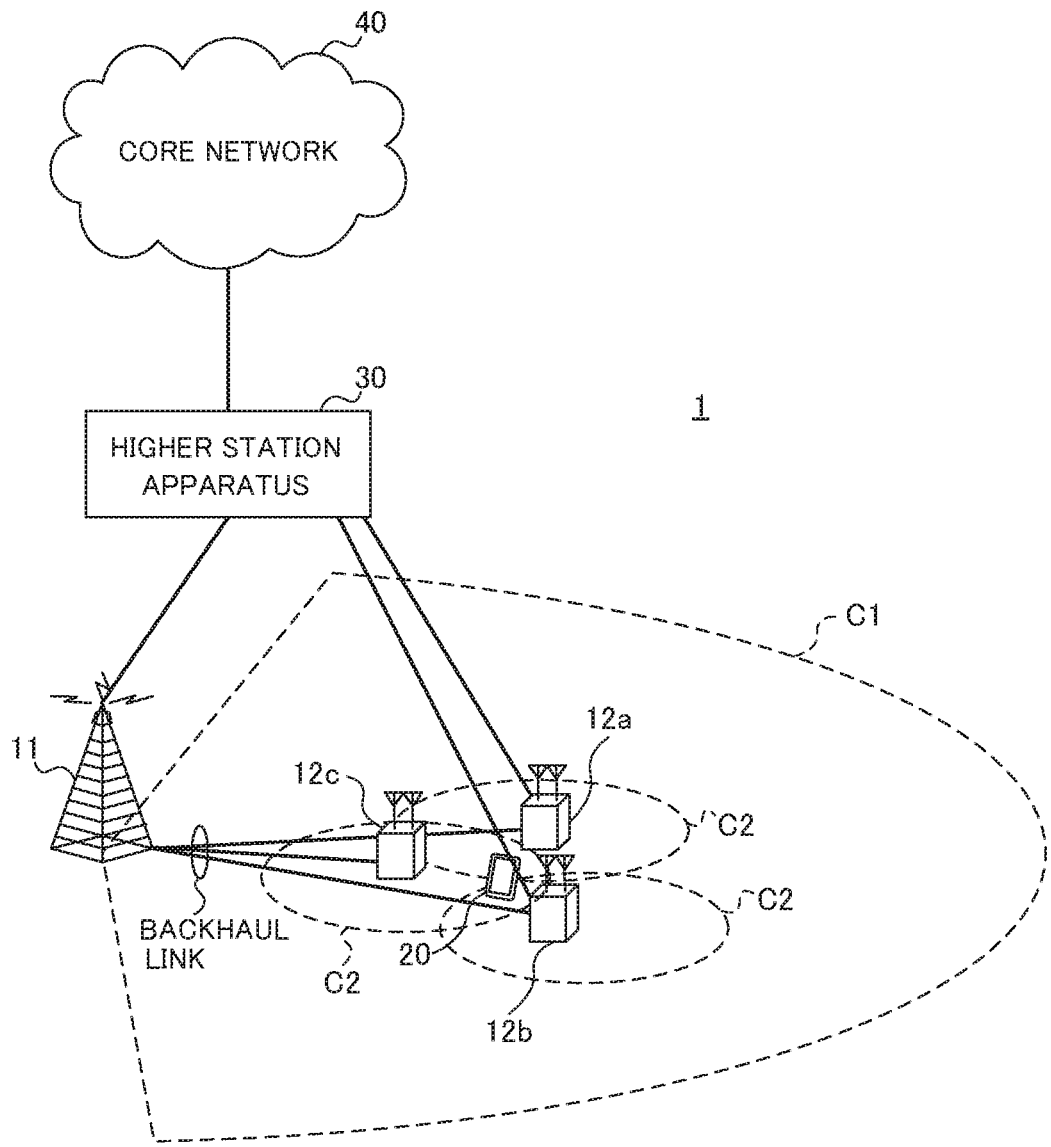
FIG. 19 is a diagram to show an example of a schematic structure of a radio communication system according to an embodiment of the present invention.

FIG. 19 is a diagram to show an example of a schematic structure of a radio communication system according to an embodiment of the present invention. Note that the radio communication system shown in FIG. 19 is a system to incorporate, for example, an LTE system, super 3G and/or an LTE-A system. This radio communication system can adopt carrier aggregation (CA) and/or dual connectivity (DC) to group a plurality of fundamental frequency blocks (component carriers) into one, where the LTE system bandwidth constitutes one unit. Also, the radio communication system shown in FIG. 19 has a radio base station (for example, an LTE-U base station) that is capable of using unlicensed bands. Note that this radio communication system may be referred to as "IMT-Advanced," or may be referred to as "4G" or "FRA" (Future Radio Access).

The radio communication system 1 shown in FIG. 19 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. For example, a mode may be possible in which the macro cell C1 is used in a licensed band and the small cells C2 are used in unlicensed bands (LTE-U). Also, a mode may be also possible in which part of the small cells is used in a licensed band and the rest of the small cells are used in unlicensed bands.

The user terminals 20 can connect with both the radio base station 11 and the radio base stations 12. The user terminals 20 may use the macro cell C1 and the small cells C2, which use different frequencies, at the same time, by means of CA or DC. For example, it is possible to transmit assist information (for example, the DL signal configuration) related to a radio base station 12 (which is, for example, an LTE-U base station) that uses an unlicensed band, from the radio base station 11 to use a licensed band to the user terminals 20. Also, a structure may be employed here in which, when CA is used between a licensed band and an unlicensed band, one radio base station (for example, the radio base station 11) controls the scheduling of licensed band cells and unlicensed band cells.

Note that it is equally possible to use a structure in which the user terminals 20 connect with the radio base stations 12, instead of connecting with the radio base station 11. For example, it is possible to use a structure in which a radio base station 12 to use an unlicensed band connects with the user terminals 20 in stand-alone. In this case, the radio base station 12 controls the scheduling of unlicensed band cells.

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. Between the radio base station 11 and the radio base stations 12 (or between two radio base stations 12) wire connection (optical fiber, the X2 interface, etc.) or radio connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as a "radio base station 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel) and downlink L1/L2 control channels are used as downlink channels. User data, higher layer control information and predetermined SIBs (System Information Blocks) are communicated in the PDSCH. Also, synchronization signals, MIBs (Master Information Blocks) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a (Physical Hybrid-ARQ Indicator CHannel) and so on. By the PDCCH, downlink control information (DCI), including PDSCH and PUSCH scheduling information, and so on communicated. The number of OFDM symbols to use for the PDCCH is transmitted by the PCFICH.

HARQ delivery acknowledgement signals (ACKs/NACKs) in response to the PUSCH are communicated by the PHICH. The EPDCCH is frequency-division-multiplexed with the PDSCH (downlink shared data channel), and may be used to communicate DCI, like the PDCCH.

Also, in the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals and so on are communicated by the PUCCH. Random access preambles (RA preambles) for establishing connections with cells are communicated by the PRACH.

Figure 20:
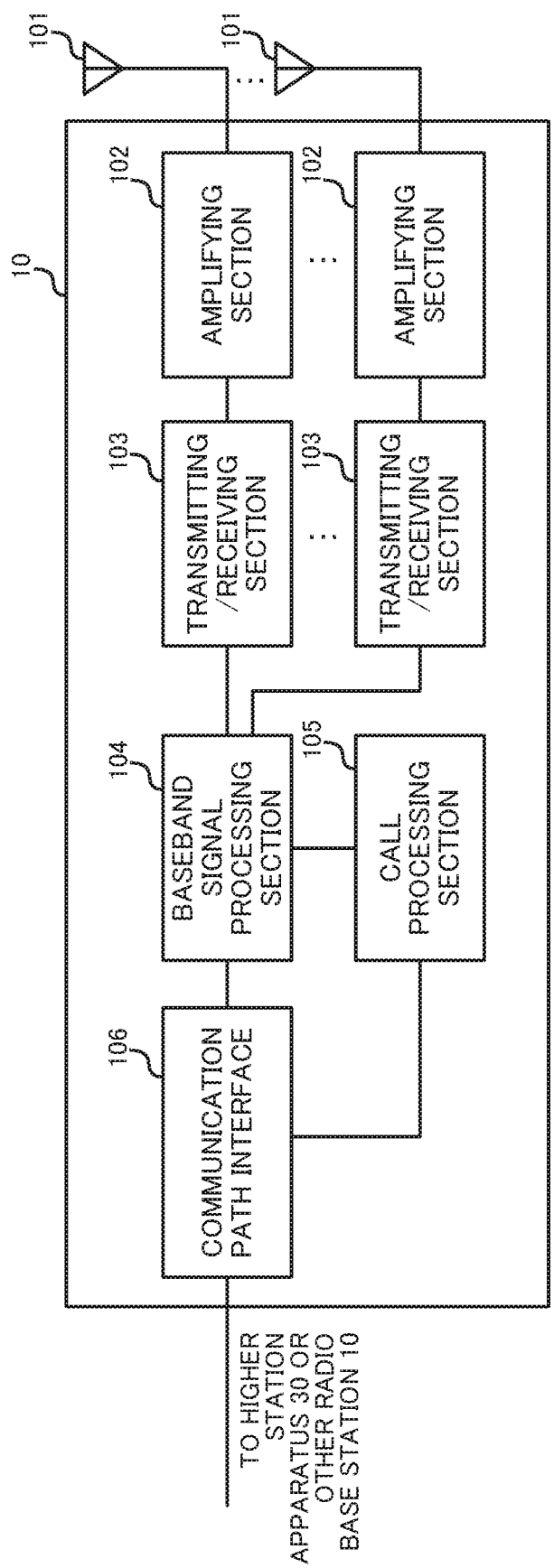
FIG. 20 is a diagram to show an example of an overall structure of a radio base station according to an embodiment of the present invention.

FIG. 20 is a diagram to show an example of an overall structure of a radio base station 10 (which may be either a radio base station 11 or 12) according to the present embodiment. The radio base station 10 has a plurality of transmitting/receiving antennas 101 for MIMO communication, amplifying sections 102, transmitting/receiving sections 103, a baseband signal processing section 104, a call processing section 105 and a communication path interface 106. Note that the transmitting/receiving sections 103 may be comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and transferred to each transmitting/receiving section 103.

Also, the baseband signal processing section 104 reports, to the user terminal 20, control information for allowing communication in the cell, through higher layer signaling (for example, RRC signaling, broadcast information and so on). The information for allowing communication in the cell includes, for example, the system bandwidth on the uplink, the system bandwidth on the downlink and so on.

Also, assist information (for example, DL TPC information and so on) that relates to unlicensed band communication may be reported from a radio base station (for example, the radio base station 11) to the user terminal 20 in a licensed band.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104. Also, the transmitting/receiving sections 103 receive signals that include predetermined information that relates to PUSCH transmission from the user terminal 20 and output these signals to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals to and from neighboring radio base stations 10 (backhaul signaling) via an inter-base station interface (for example, optical fiber, the X2 interface, etc.). For example, the communication path interface 106 may transmit and receive TDD UL/DL configurations, special subframe configurations, sensing subframe configurations, sensing patterns and so on with neighboring radio base stations 10.

Figure 21:
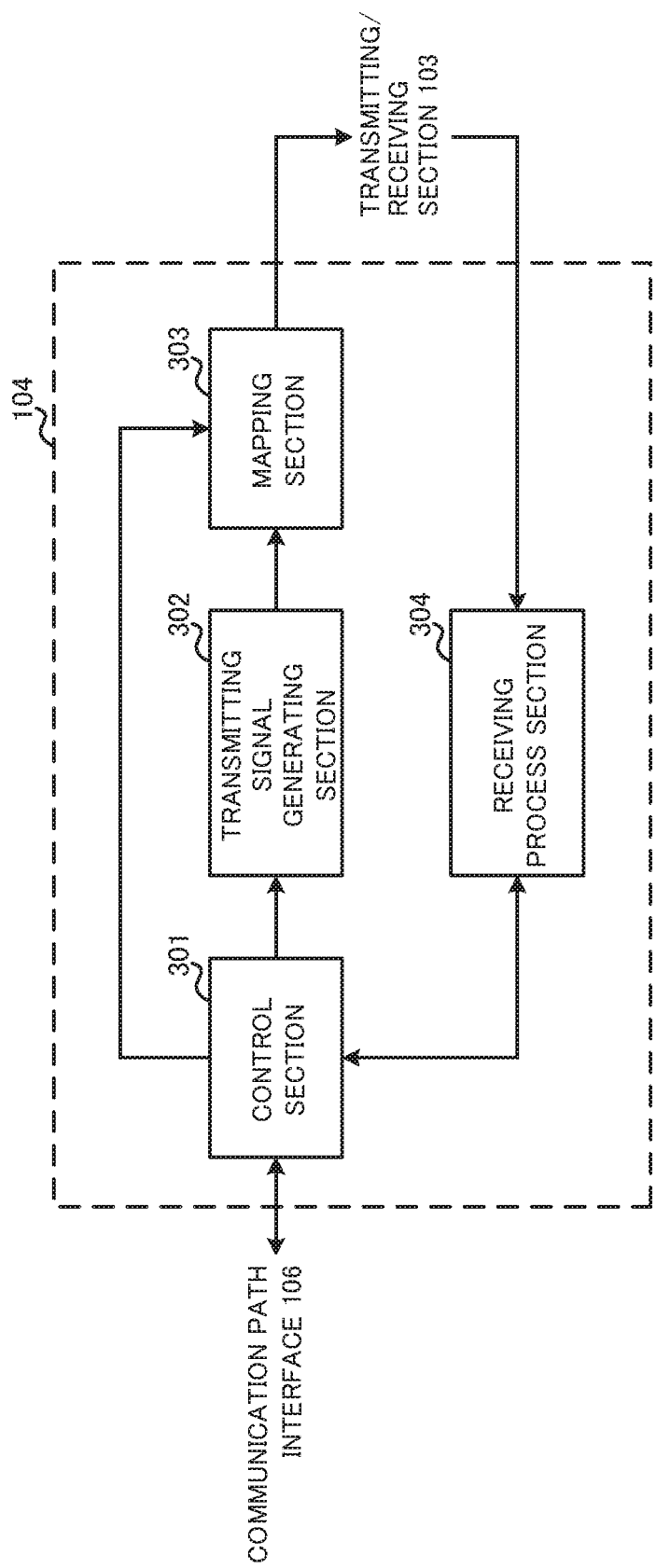
FIG. 21 is a diagram to show an example of a functional structure of a radio base station according to an embodiment of the present invention.

FIG. 21 is a diagram to show an example of a functional structure of a radio base station according to the present embodiment. Note that, although FIG. 21 primarily shows functional blocks that pertain to characteristic parts of the present embodiment, the radio base station 10 has other functional blocks that are necessary for radio communication as well.

As shown in FIG. 21, the baseband signal processing section 104 provided in the radio base station 10 has a control section (scheduler) 301, a transmission signal generating section 302, a mapping section 303 and a receiving process section 304.

The control section (scheduler) 301 controls the scheduling of (for example, allocates resources to) downlink data signals that are transmitted in the PDSCH and downlink control signals that are communicated in the PDCCH and/or the enhanced PDCCH (EPDCCH). Also, the control section 301 controls the scheduling of downlink reference signals such as system information, synchronization signals, the CRS (Cell-specific Reference Signal), the CSI-RS (Channel State Information Reference Signal) and so on. Also, the control section 301 also controls the scheduling of uplink data signals that are transmitted in the PUSCH, uplink control signals that are transmitted in the PUCCH and/or the PUSCH, RA preambles that are transmitted in the PRACH, and so on. Note that, when a licensed band and an unlicensed band are scheduled with one control section (scheduler) 301, the control section 301 might control communication in licensed band cells and unlicensed band cells. For the control section 301, a controller, a control circuit or a control device that can be described based on common understanding of the technical field to which the present invention pertains can be used.

Also, the control section 301 may determine the sensing pattern and/or the sensing subframe configuration for use in the user terminal 20, output the determined sensing pattern and/or sensing subframe configuration to the transmission signal generating section 302, and control the mapping section 303 to map signals including these pieces of information.

Based on predetermined information that relates to PUSCH transmission and that is input from the receiving process section 304, the control section 301 controls the transmission signal generating section 302, the mapping section 303 and the receiving process section 304 to demodulate the PUSCH of the user terminal 20. To be more specific, when the predetermined information is a scheduling request (SR)/random access preamble (RAP), the control section 301 controls the transmission signal generating section 302 and the mapping section 303 to transmit a UL grant that indicates an adequate radio resource, and controls the receiving process section 304 to demodulate the PUSCH in this radio resource (first embodiment).

Also, the control section 301 applies control so that a group of adequate user terminals are selected, and a plurality of UL grants (CB grants) that are shared in common among them are reported (second embodiment). In this case, if the predetermined information is information to represent CB grants, the receiving process section 304 is controlled to demodulate the PUSCH in the radio resources indicated by the CB grants. Note that the control section 301 executes control so that predetermined indicators (for example, CB-RNTIs) to correspond to the CB grants are reported to the user terminal group in advance.

Also, when the predetermined information is information that is necessary to demodulate the PUSCH (for example, the resource block (RB) to allocate the PUSCH, the MCS, the PHICH resource indication and so on), the control section 301 controls the receiving process section 304 to demodulate the PUSCH in the radio resource indicated by this information (third embodiment).

The transmission signal generating section 302 generates DL signals (downlink control signals, downlink data signals, downlink reference signals and so on) based on commands from the control section 301, and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are determined based on channel state information (CSI) from each user terminal 20. For the transmission signal generating section 302, a signal generator or a signal generating circuit that can be described based on common understanding of the technical field to which the present invention pertains can be used.

The mapping section 303 maps the downlink signals generated in the transmission signal generating section 302 to radio resources based on commands from the control section 301, and outputs these to the transmitting/receiving sections 103. For the mapping section 303, a mapping circuit or a mapper that can be described based on common understanding of the technical field to which the present invention pertains can be used.

The receiving process section 304 performs receiving processes (for example, demapping, demodulation, decoding and so on) of UL signals (for example, delivery acknowledgement signals (HARQ-ACK), data signals that are transmitted in the PUSCH and so on) transmitted from the user terminals. Also, the receiving process section 304 may measure the received power (RSRP), channel states and so on by using the received signals. Note that the processing results and the measurement results may be output to the control section 301. For the receiving process section 304, a signal processor/measurer, or a signal processing circuit/measurement circuit that can be described based on common understanding of the technical field to which the present invention pertains can be used.

The receiving process section 304 acquires the predetermined information that relates to PUSCH transmission and output this to the control section 301. Also, the receiving process section 304 receives and demodulates the PUSCH in the radio resources designated by the predetermined information, based on commands from the control section 301.

Figure 22:
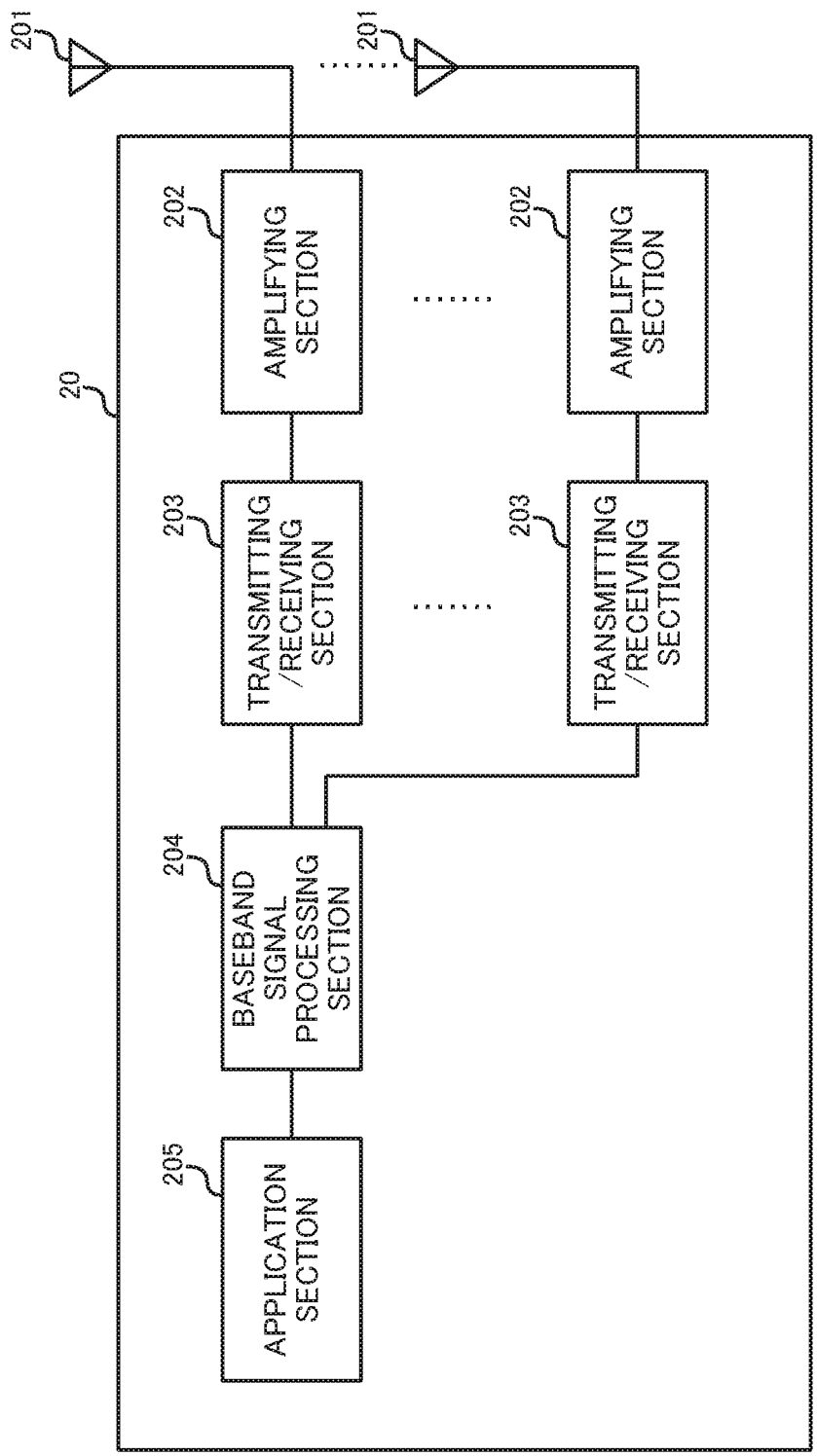
FIG. 22 is a diagram to show an example of an overall structure of a user terminal according to an embodiment of the present invention.

FIG. 22 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying section 202. The received signals are subjected to frequency conversion and converted into the baseband signal in the transmitting/receiving sections 203, and then output to the baseband signal processing section 204. For the transmitting/receiving sections 203, transmitters/receivers, transmitting/receiving circuits or transmitting/receiving devices that can be described based on common understanding of the technical field to which the present invention pertains can be used. The transmitting/receiving sections 203 are capable of transmitting/receiving UL/DL signals in unlicensed bands. Note that the transmitting/receiving section 203 may be capable of transmitting/receiving UL/DL signals in licensed bands as well.

In the baseband signal processing section 204, the baseband signals that are input are subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 23:
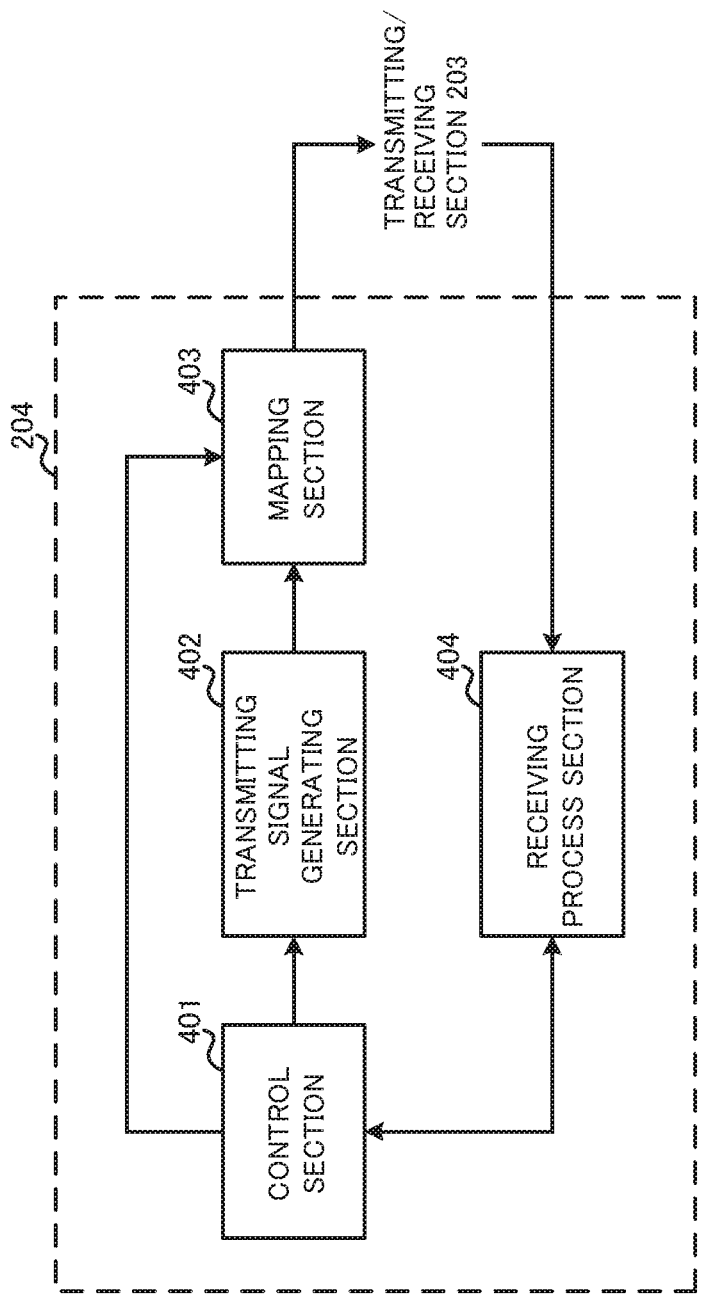
FIG. 23 is a diagram to show an example of a functional structure of a user terminal according to an embodiment of the present invention.

FIG. 23 is a diagram to show an example of a functional structure of a user terminal according to the present embodiment. Note that, although FIG. 23 primarily shows functional blocks that pertain to characteristic parts of the present embodiment, the user terminal 20 has other functional blocks that are necessary for radio communication as well.

As shown in FIG. 23, the baseband signal processing section 204 provided in the user terminal 20 has a control section 401, a transmission signal generating section 402, a mapping section 403 and a receiving process section 404.

The control section 401 acquires the downlink control signals (signals transmitted in the PDCCH/EPDCCH) and downlink data signals (signals transmitted in the PDSCH) transmitted from the radio base station 10 from the received signal processing section 404. The control section 401 controls the generation of uplink control signals (for example, delivery acknowledgement signals (HARQ-ACK) and so on) and uplink data signals based on the results of judging whether or not retransmission control is necessary for the downlink control signals, the downlink data signals and so on. To be more specific, the control section 401 controls the transmission signal generating section 402 and the mapping section 403. For the control section 401, a controller or a control device that can be described based on common understanding of the technical field to which the present invention pertains can be used.

Also, the control section 401 has a function for learning the buffer size of UL data that is input from the application section 205, and, when there is UL data, controls the receiving process section 404 to carry out UL-LBT in sensing subframes. Note that it is equally possible to make the receiving process section 404 perform UL-LBT even when there is no UL data.

Here, the control section 401 controls predetermined subframes as sensing subframes. For example, the control section 401 may learn the sensing pattern from a report from the radio base station 10, and execute control over the sensing subframes based on this sensing pattern.

If, as a result of making the receiving process section 404 execute UL-LBT, the control section 401 judges that a channel is free, the control section 401 controls the transmission signal generating section 402 and the mapping section 403 to transmit given information that relates to PUSCH transmission in the same subframe as the subframe in which UL-LBT is executed. To be more specific, the control section 401 controls the transmission signal generating section 402 and the mapping section 403 to transmit a scheduling request (SR)/random access preamble (RAP) in the report period in a sensing subframe (first embodiment).

Also, when a plurality of UL grants (CB grants) are reported to a group of predetermined user terminals from the radio base station 10 in advance, the control section 401 controls the transmission signal generating section 402 and the mapping section 403 to transmit information to represent at least one CB grant in the report period in a sensing subframe (second embodiment). Note that the control section 401 may be structured to make the receiving process section 404 execute UL-LBT when a report arrives from the receiving process section 404 to the effect that a CB grant has been detected. For example, the control section 401 may control the receiving process section 404 to execute LBT in a sensing subframe after a CB grant is detected.

Also, the control section 401 controls the transmission signal generating section 402 and the mapping section 403 to transmit information that is necessary to demodulate the PUSCH (for example, the resource block (RB) to allocate the PUSCH, the MCS, the PHICH resource indication and so on) in the report period in a sensing subframe (third embodiment).

Also, the control section 401 controls the transmission signal generating section 402 and the mapping section 403 to transmit the PUSCH in the radio resources which are indicated by the information that relates to PUSCH transmission, transmitted to the radio base station 10.

Note that when the sensing configuration, the sensing subframe configuration and so on are cell-specific, it is preferable if the control section 401 controls predetermined information to be transmitted in random radio resources within the report period (for example, in randomly determined OFDM symbols). Also, when the sensing configuration, the sensing subframe configuration and so on are user terminal-specific, it is preferable if the control section 401 controls predetermined information to be transmitted in an earlier timing in the report period (for example, in the first OFDM symbol).

The transmission signal generating section 402 generates UL signals (uplink control signals, uplink data signals, uplink reference signals and so on) based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. Note that, when a UL grant is contained in a downlink control signal reported from the radio base station 10, the control section 401 commands the transmission signal generating section 402 to generate an uplink data signal. For the transmission signal generating section 402, a signal generator or a signal generating circuit that can be described based on common understanding of the technical field to which the present invention pertains can be used.

The mapping section 403 maps the uplink signals generated in the transmission signal generating section 402 to radio resources based on commands from the control section 401, and output the result to the transmitting/receiving section 203. For the mapping section 403, a mapping circuit or a mapper that can be described based on common understanding of the technical field to which the present invention pertains can be used.

The receiving process section 404 performs receiving processes (for example, demapping, demodulation, decoding and so on) of the DL signals transmitted in licensed bands and unlicensed bands (for example, downlink control signals transmitted from the radio base station, downlink data signals transmitted in the PDSCH, and so on). When receiving the TDD UL/DL configuration, the special subframe configuration, the sensing subframe configuration, the sensing pattern and so on from the radio base station 10, the receiving process section 404 outputs these to the control section 401. Also, the receiving process section 404 may measure the received power (RSRP), channel states and so on by using these received signals. Note that the processing results and measurement results may be output to the control section 401. For the receiving process section 404, a signal processor/measurer, or a signal processing circuit/measurement circuit that can be described based on common understanding of the technical field to which the present invention pertains can be used.

The receiving process section 404 executes LBT in an unlicensed band by using predetermined subframes (for example, special subframes) as sensing subframes based on commands from the control section 401, and outputs the results of LBT (for example, the results of judging whether or not the channel state is clear or busy) to the control section 401.

Also, the receiving process section 404 detects CB grants based on predetermined indicators (for example, CB-RNTIs) that correspond to each CB grant. When a CB grant is detected, a report may be sent to the control section 401.

Note that the block diagrams that have been used to describe the above embodiments show blocks in function units. These functional blocks (components) may be implemented in arbitrary combinations of hardware and software. Also, means for implementing each functional block is not particularly limited.

That is, each functional block may be implemented with one physically-integrated device, or may be implemented by connecting two physically separate devices via radio or wire and using these multiple devices.

For example, part or all of the functions of radio base stations 10 and user terminals 20 may be implemented using hardware such as ASICs (Application to Specific Integrated Circuits), PLDs (Programmable Logic Devices), FPGAs (Field Programmable Gate Arrays), and so on. Also, the radio base stations 10 and the user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an optomagnetic disk, a ROM, an EPROM, a CD-ROM, a RAM, a hard disk and so on. Also, the programs may be transmitted from the network through, for example, electric communication channels. Also, the radio base stations 10 and the user terminals 20 may include input devices such as input keys and output devices such as displays.

The functional structures of the radio base stations 10 and the user terminals 20 may be implemented with the above-described hardware, may be implemented with software modules that are executed on the processor, or may be implemented with combinations of both. The processor controls the whole of the user terminals by allowing the operating system to work. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
    a receiver that performs sensing before signal transmission; and
    a transmitter that transmits a physical uplink shared channel (PUSCH) and given information regarding PUSCH transmission based on a sensing result,
    wherein a duration where the sensing is performed and a report duration where the given information regarding the PUSCH transmission is transmitted are included in a given duration, wherein the given information regarding the PUSCH transmission includes information required for demodulation of the PUSCH, wherein the given duration includes the duration for the sensing, the report duration where the information required for demodulation of the PUSCH is transmitted, and a duration for the PUSCH transmission, and wherein the transmitter transmits the given information regarding the PUSCH transmission in a symbol that is determined based on a random procedure.

2. The terminal according to claim 1, wherein the transmitter transmits the PUSCH without using a UL grant as a basis.

3. A radio communication method for a terminal, comprising:

performing sensing before signal transmission; and transmitting a physical uplink shared channel (PUSCH) and given information regarding PUSCH transmission based on a sensing result, wherein a duration where the sensing is performed and a report duration where the given information regarding the PUSCH transmission is transmitted are included in a given duration, wherein the given information regarding the PUSCH transmission includes information required for demodulation of the PUSCH, wherein the given duration includes the duration for the sensing, the report duration where the information required for demodulation of the PUSCH is transmitted, and a duration for the PUSCH transmission, and wherein the terminal transmits the given information regarding the PUSCH transmission in a symbol that is determined based on a random procedure.

* * * * *